(12) United States Patent
Hiwatashi et al.

(10) Patent No.: US 12,522,292 B2
(45) Date of Patent: *Jan. 13, 2026

(54) TRAVEL OPERATION DEVICE FOR CRAWLER AERIAL WORK VEHICLE

(71) Applicant: AIRMAN CORPORATION, Niigata (JP)

(72) Inventors: Masaki Hiwatashi, Niigata (JP); Isao Masuda, Niigata (JP); Norihide Ikarashi, Niigata (JP)

(73) Assignee: AIRMAN CORPORATION, Niigata (JP)

( * ) Notice: Subject to any disclaimer, the term of this patent is extended or adjusted under 35 U.S.C. 154(b) by 611 days.

This patent is subject to a terminal disclaimer.

(21) Appl. No.: 17/905,972

(22) PCT Filed: Mar. 11, 2021

(86) PCT No.: PCT/JP2021/009901
§ 371 (c)(1),
(2) Date: Sep. 9, 2022

(87) PCT Pub. No.: WO2021/200019
PCT Pub. Date: Oct. 7, 2021

(65) Prior Publication Data
US 2023/0106187 A1    Apr. 6, 2023

(30) Foreign Application Priority Data

Apr. 1, 2020 (JP) .................................. 2020-066173

(51) Int. Cl.
*B62D 9/00* (2006.01)
*B62D 11/04* (2006.01)
(Continued)

(52) U.S. Cl.
CPC ................ *B62D 11/04* (2013.01); *B66F 9/24* (2013.01); *B66F 11/042* (2013.01)

(58) Field of Classification Search
CPC ........ B62D 11/02; B62D 11/04; B62D 55/00; B62D 55/06; B62D 55/065; B66F 9/205;
(Continued)

(56) References Cited

U.S. PATENT DOCUMENTS 9,242,523 B2 *   1/2016   Teppig, Jr. ................ B63B 7/04
9,604,679 B2 *   3/2017   Steben ................... B62D 55/06
(Continued)

FOREIGN PATENT DOCUMENTS

JP          05096160 U       12/1993
JP          H07-101698 A     4/1995
(Continued)

OTHER PUBLICATIONS

International Search Report dated May 11, 2021 issued in Patent Application No. PCT/JP2021/009901.
(Continued)

*Primary Examiner* — Chi Q Nguyen
(74) *Attorney, Agent, or Firm* — Rankin, Hill & Clark LLP

(57) ABSTRACT

A travel operation device for a crawler aerial work vehicle equipped with an operating stick 20, the operating stick 20 having an operating stick body 21, a left-swivel switch 24, a right-swivel switch 25, and an enable switch 22, these switches are arranged at positions on the operating stick body 21 so that the enable switch 22, the left-swivel switch 24 and/or the right-swivel switch 25 can be operated simultaneously with the same hand that holds the operating stick body 21.

15 Claims, 13 Drawing Sheets

(51) Int. Cl.
 *B66F 9/24* (2006.01)
 *B66F 11/04* (2006.01)

(58) Field of Classification Search
 CPC .. B66F 9/24; B66F 11/00; B66F 11/04; B66F 11/042; B60K 26/02; B60K 1/02
 See application file for complete search history.

(56) References Cited

U.S. PATENT DOCUMENTS

| | | | | |
|---|---|---|---|---|
| 11,054,134 | B2* | 7/2021 | Ragnarsson | F23G 5/40 |
| 12,257,896 | B2* | 3/2025 | Ikarashi | B60K 1/02 |
| 2016/0179128 | A1* | 6/2016 | Guglielmo | G06F 3/016 182/19 |
| 2017/0311544 | A1* | 11/2017 | Ikeda | A01D 75/285 |
| 2021/0219481 | A1* | 7/2021 | Haynes | A01B 75/00 |
| 2021/0262195 | A1* | 8/2021 | Nishi | E02F 9/265 |
| 2022/0281730 | A1* | 9/2022 | Masuda | B66F 11/04 |
| 2022/0289543 | A1* | 9/2022 | Ikarashi | B66F 11/042 |
| 2022/0314782 | A1* | 10/2022 | Shinozaki | B62D 55/125 |
| 2022/0379327 | A1* | 12/2022 | Ukai | A01M 7/0042 |
| 2024/0341224 | A1* | 10/2024 | Patzer | A01D 34/78 |

FOREIGN PATENT DOCUMENTS

| | | |
|---|---|---|
| JP | H08-142873 A | 6/1996 |
| JP | H11158932 A | 6/1999 |
| JP | 2002104227 A | 4/2002 |
| JP | 2003-267253 A | 9/2003 |
| JP | 2009-035419 A | 2/2009 |
| JP | 2010222087 A | 10/2010 |
| JP | 2014-069728 A | 4/2014 |
| JP | 2016-118820 A | 6/2016 |
| JP | 6080458 B2 | 2/2017 |

OTHER PUBLICATIONS

Chinese Office Action (CNOA) dated Jun. 19, 2025 issued for Chinese patent application No. 202180026812.1 and its English machine translation.

* cited by examiner

TRAVEL OPERATION DEVICE FOR CRAWLER AERIAL WORK VEHICLE

FIELD OF THE INVENTION

The present invention relates to a traveling operation device of crawler-type aerial work platform, and in detail relates to a traveling operation device that causes an aerial work platform to perform advance, retreat and turn, according to an operation by an operator who rides on a deck in a caterpillar self-propelled aerial work platform. The crawler self-propelled aerial work platform includes the deck on which the operator rides on above an undercarriage including crawlers as traveling devices and motors to drive the crawlers and an elevating mechanism to cause the deck to move up and down above the undercarriage.

BACKGROUND OF THE INVENTION

As illustrated in FIG. 10, a crawler-type aerial work platform 100 includes a deck 104 and an elevating mechanism (a scissors link mechanism in the illustrated example) 103. The deck 104 is moved up and down while an operator or the like rides on an undercarriage 102, which includes crawlers 105 (105a, 105b) as traveling devices. The elevating mechanism 103 is to move up and down the deck 104 above the undercarriage 102. A pair of motors (not illustrated) that independently drive the respective crawlers 105a, 105b disposed at the left and the right of the undercarriage 102 are mounted on the undercarriage 102, and thus self-propelling is possible.

The crawler-type aerial work platform 100 includes a control panel 110 installed on the deck 104 and a traveling operation device configured of a controller that controls an operation of the pair of motors described above according to an operation of a lever and a switch disposed on the control panel. The operator who rides on the deck operates the lever, the switch, and the like disposed on the control panel 110 to advance, retreat and turn the aerial work platform 100 to ensure driving.

FIG. 11 illustrates an exemplary configuration of the control panel 110 employed in the traveling operation device of the crawler-type aerial work platform 100.

The control panel 110 illustrated in FIG. 11 individually includes a left side traveling lever 125a that operates the left side crawler 105a and a right side traveling lever 125b that operates the right side crawler 105b, respectively. Both of the left side traveling lever 125a and the right side traveling lever 125b are configured as uniaxial levers tiltable only in one axis direction of back and forth. Thus, the controller (not illustrated) controls rotation directions and rotation speeds of the respective motors for the left side and right side crawlers according to tilt directions and tilt angles of the left side traveling lever 125a and the right side traveling lever 125b.

In view of this, as one example, the aerial work platform 100 moves straight ahead when both the left side traveling lever 125a and the right side traveling lever 125b are tilted forward at the same tilt angle with respect to a neutral position. The aerial work platform 100 advances while turning to a side with a smaller tilt angle when the left side traveling lever 125a and the right side traveling lever 125b are tilted forward at different tilt angles.

In addition, the aerial work platform 100 retreats in the straight direction when both the left side traveling lever 125a and the right side traveling lever 125b are tilted backward at the same tilt angle with respect to a neutral position. The aerial work platform 100 retreats while turning to a side with a smaller tilt angle when the left side traveling lever 125a and the right side traveling lever 125b are tilted backward at different tilt angles.

Furthermore, when one of the left side traveling lever 125a or the right side traveling lever 125b is set to a neutral position and the other is tilted forward or backward, a turning movement is performed with the crawler on the neutral side as a supporting point (such turning movement that stops one of the left and right crawlers and uses the crawler at the stopped side as a supporting point will be referred to as "pivot turn" in this specification), and when the left side traveling lever 125a and the right side traveling lever 125b are tilted in the opposite direction in back and front, the left side crawler 105a and the right side crawler 105b respectively rotate in opposite directions, and the aerial work platform performs turning movement on the spot (such turning movement of the aerial work platform by reversely rotating the left and right sides crawler will be referred to as "spin turn" in this specification).

As illustrated in FIG. 12, as the control panel 110 of the crawler-type aerial work platform 100, the following traveling operation device has been proposed (see FIG. 3 in Patent Document 1). A travel operation lever 125 capable of tilt operation only in one axis direction of back and forth is disposed. By tilting the travel operation lever 125 from a neutral position in a front-rear direction, a travel operation to advance the aerial work platform 100 by the forward tilt, to retreat the aerial work platform 100 by the backward tilt, and to stop the aerial work platform 100 at the neutral position is performed. A turning amount operation dial 126 as a rotary switch is disposed. Rotation of the turning amount operation dial 126 from the neutral position to the right or left direction allows operating a turning direction and an amount of turning of the aerial work platform 100 according to the rotation direction and the amount of rotation.

Although it does not relate to a drive operating device of the crawler-type aerial work platform, but to the control panel of the aerial work platform equipped with a wheel-type (tire-type) traveling device as illustrated in FIG. 13, a drive operating device 120 wherein a single biaxial lever 127 tiltable in biaxial directions of the front-rear direction and the left-right direction is provided, and by operating this biaxial lever 127, operation of the aerial work platform 100 for advancing, retreating and stopping and operation of the aerial work platform 100 for turning right or left (steering operation) by tilting in the left-right direction can be performed at the same time is also proposed (See FIG. 1 of Patent Document 2).

RELATED ART DOCUMENTS

Patent Document

[Patent Document 1] Japanese Patent No. 6080458
[Patent Document 2] Japanese Patent KOKAI No. H08-142873 (LOPI; automatically published after around 18 months from filing date regardless prosecution)

SUMMARY OF THE INVENTION

Problems to be Solved by the Invention

Among the control panels 110 of the traveling operation devices described above, as described with reference to FIG. 11, in the configuration of individually disposing the left side traveling lever 125a that operates the left side crawler 105a and the right side traveling lever 125b that operates the right side crawler 105b, respectively, the tilt directions and the tilt angles of the left side traveling lever 125a and the right side traveling lever 125b correspond to the rotation directions and the rotation speeds of the left side crawler 105a and the right side crawler 105b, respectively. This allows the operator to intuitively perform a travel operation of the aerial work platform 100.

However, in the configuration described above, the rotation directions and the rotation speeds of the left side crawler 105a and the right side crawler 105b are operated individually. Therefore, it is difficult for an inexperienced operator to perform basic operations such as an operation of tilting the left side traveling lever 125a and the right side traveling lever 125b at the same tilt angle and keeping the angle to move the aerial work platform 100 straight ahead, and the aerial work platform 100 cannot be moved straight ahead stably.

In contrast to this, in the traveling operation device including the control panel 110 described with reference to FIG. 12, the operations of advance, retreat, and stop of the aerial work platform 100 are performed by using the travel operation lever 125 which is a uniaxial lever, and the operation of turning the aerial work platform 100 is performed by using the turning amount operation dial 126. This allows even the inexperienced operator to drive the aerial work platform 100 relatively easily.

However, in the aerial work platform 100, the above-described control panel 110 is installed at a position where the operator can easily operate the control panel 100 while the operator is standing on the deck 104, such as at an upper end portion of a safety barrier 140, which is generally installed on the deck 104 as illustrated in FIG. 10. Therefore, the operator drives the aerial work platform while the operator is standing on the deck.

Accordingly, in the case where the control panel 110 that the operator operates with both hands is installed, such as the control panel described with reference to FIG. 11 or the control panel 110 disclosed in Patent Document 1 described with reference to FIG. 12, the operator drives the aerial work platform 100 with his/her hands full. Therefore, it is difficult for the operator to support his/her body by holding on to the safety barrier 140 or the like, and the operator has to drive the aerial work platform 100 while oscillation occurring during traveling is absorbed only by his/her feet. As a result, to drive the aerial work platform 100, the operator should be experienced, and the operator may not support his/her body and may fall on the deck 104 in the case where the aerial work platform 100 shakes badly, such as a case where the aerial work platform 100 gets over a bump or a case where the aerial work platform 100 crashes into an obstacle.

In contrast to this, the control panel disclosed in Patent Document 2 described with reference to FIG. 13 is configured to perform the operation of advance or retreat of the aerial work platform 100 simultaneously with the operation of turning the aerial work platform 100 left or right by using the single biaxial lever 127 tiltable in biaxial directions of the front-rear direction and the left-right direction. This allows the operator to operate the lever 127 with one hand while preparing for vibration, impact, and the like by holding on to the safety barrier 140 with the other empty hand. This is convenient for the operator.

However, the crawler-type aerial work platform includes continuous tracks (such as rubber crawlers) of the crawlers having outer peripheral surfaces on which projections called lugs 106 are formed at predetermined intervals as illustrated in FIG. 10. The outer peripheral surfaces serve as ground contact surfaces. Due to vibration occurring when the lugs 106 come into contact with the ground during traveling, the crawler-type aerial work platform shakes more badly than a wheel-type (tire-type) aerial work platform during traveling. The operator riding on the deck of the crawler-type aerial work platform is constantly swayed in the left-right direction during traveling.

In this case, while the uniaxial lever does not cause serious problems on operations because the uniaxial lever moves only in the front-rear direction, when the control panel 110 of the crawler-type aerial work platform is provided with the biaxial lever tiltable in the biaxial directions of the front-rear direction and the left-right direction, a drive operation of the aerial work platform becomes difficult; for example, it is difficult to stably move the aerial work platform straight ahead because both the operator and the lever are swayed in the left-right direction.

Note that, the aerial work platform 100 described with reference to FIG. 10 is provided with an enable switch 122. The enable switch 122 enables the operations of the left side and right side traveling levers 125a, 125b only while the enable switch 122 is depressed. Thus, malfunction, such as an unintentional start of traveling of the aerial work platform 100, is avoided even when a part of the body of the operator comes into contact with the traveling levers 125a, 125b or the like disposed on the control panel 110 while the operator performs a work on the deck in the state where the aerial work platform 100 is stopped. Therefore, malfunction, such as an unintentional start of traveling of the aerial work platform 100, does not occur even when the operator mistakenly touches the traveling levers 125a, 125b disposed on the control panel 110 unless the enable switch 122 is depressed. This makes it possible to prevent accidents.

In the aerial work platform 100, the above-described control panel 110 is generally installed in a state of being fixed to, for example, the safety barrier 140 of the deck 104. However, the inventors of the present invention considered that by configuring this so as to be removably attachable and can be carried to outside the deck 104, according to working conditions, the control panel 110 can also be used as a remote controller (a remote control) for remote operation of the aerial work platform 100.

Thus, when the control panel 110 can also be used as the remote control, even when the operator does not ride on the deck 104, the aerial work platform 100 can be traveled. For example, in a usual use state, the control panel 110 is installed to, for example, the safety barrier 140 of the deck 104 for use. In a case where driving while a person is onboard is risky, such as traveling when the aerial work platform 100 is loaded onto or unloaded from a vehicle carrier car, such as a self loader and a safety loader, and traveling when loading or unloading is performed on a loading platform of a motor truck using a loading ramp (an on-board slope), or the similar case, or in a case where the aerial work platform 100 is caused to pass through a location difficult to pass through (a height is low) while the operator rides on the deck, such as an entrance of an elevator when the aerial work platform 100 is loaded on the elevator and carried for use for a building work, without the riding of the operator on the deck 104, the control panel 110 is removed and used as the remote control, thus ensuring operating a drive operating device 120 disposed in the control panel 110 outside the deck 104 for traveling.

However, as described above, in the configuration in which the enable switch 122 is a foot switch, the operator can operate the foot switch (the enable switch 122) only while the operator is riding on the deck 140. In this case, the control panel 110 cannot function as the above-described remote control.

To solve the above-described problems, it can be considered to employ a configuration of providing, for example, an enable switch that is a momentary switch, on the control panel 110, instead of the foot switch type enable switch 122 described above. However, the existing control panel 110 has a comparatively large box shape, and even an adult male needs to carry the control panel 110 by holding it in his arm. If the enable switch is disposed on such a control panel 110, the operator has to operate both the traveling operation device 120 and the enable switch simultaneously while holding the control panel 110 in his/her arm. This makes it difficult for the operator to perform operations.

As described above, in the case of employing the configuration in which the control panel 110 constituting the traveling operation device is provided with the uniaxial lever that is movable only in the front-rear direction, the control panel 110 has an advantage in which it is easy to operate the lever even disposed on the crawler-type aerial work platform that generates relatively large vibration during traveling. However, in this configuration, it is necessary to employ the configuration of providing the two uniaxial levers including the left side traveling lever 125a and the right side traveling lever 125b as illustrated in FIG. 11 because it is impossible to simultaneously perform the operation of advance, retreat, or stop of the aerial work platform and the operation of turning the aerial work platform left or right by using a single uniaxial lever. Alternatively, it is necessary to provide the traveling lever 125 that is the single uniaxial lever and the turning amount operation dial 126 to perform the turning operations, like the control panel disclosed in Patent Document 1 described with reference to FIG. 12. Any of the configurations has a problem that the operator has to use both hands to drive the aerial work platform 100 and cannot hold on to the safety barrier 140 to support his/her body.

In contrast to this, as in the configuration disclosed in Patent Document 2 described with reference to FIG. 13, in the case where the aerial work platform 100 is driven by using the biaxial lever 127 tiltable in the biaxial directions of the front-rear direction and the left-right direction, the control panel has an advantage in which the operator can perform both the operation of advance or retreat of the aerial work platform 100 and the operation of turning the aerial work platform 100 left or right with one hand. However, if such a control panel is applied to the crawler-type aerial work platform that generates large vibration during traveling, the control panel has a problem that both the operator and the operation lever 127 are swayed in the left-right direction, the aerial work platform 100 travels while wobbling in the left-right direction, and thus this makes it difficult to allow the aerial work platform 100 to travel straight stably.

In addition, in the configuration in which the enable switch 122 is the foot switch as described above, it is possible to operate the enable switch with a foot. While this prevents the operator from using both hands due to the operation of the enable switch 122, such a configuration has a problem that the control panel 110 cannot be removed from the deck 104 and cannot be used as a remote control.

In contrast to this, in the case where the enable switch is disposed on the control panel 110, there is an advantage in which the control panel 110 can be removed from the deck 104 and operated as a remote control outside the deck. However, there is also a disadvantage in which it is difficult for the operator to operate the enable switch because the operator performs operations while holding the control panel 110 in his/her arm even if the configuration of the control panel provided with the lever 127 that allows the operator to perform a travel operation and a steering operation with one hand as disclosed in Patent Document 2 described above is employed.

Therefore, the present invention has been made to solve the above-described drawbacks in the related arts, and an object of the present invention is to provide a traveling operation device of crawler-type aerial work platform. The traveling controller includes a control panel provided with a travel operation lever. As the travel operation lever, a uniaxial lever configured to tilt only in a front-rear axis direction is employed. This makes it possible to prevent the travel operation lever from being swayed in a left-right direction and to operate the aerial work platform to stably move straight ahead even if the uniaxial lever is employed in the crawler-type aerial work platform that generates large vibration during traveling. In addition, all operations including the above-described operation of the enable switch and the travel operations of advance, retreat, turn (including pivot turn and spin turn), and the like of the aerial work platform can be performed with one hand. This allows an operator to perform the operations while holding on to a safety barrier with the other empty hand in a stable posture where both feet are placed on a deck without having an unstable posture where the operator stands on one foot to operate a foot switch type enable switch. In addition, this can prevent the operator from falling on the deck and the like, and the control panel is removable from the deck and usable as a remote control.

In addition, another object of the present invention is to provide a traveling operation device of the crawler-type aerial work platform. The traveling operation device includes a controller configured to perform rotation control of a left side motor and a right side motor for advancing, retreating, stopping, and turning (including pivot turn and spin turn) the aerial work platform in response to operations performed on the control panel configured to allow the operator to perform all the travel operations with one hand.

Means for Solving the Problem

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above object, a traveling operation device 10 of self-propelled crawler-type aerial work platform 1 comprises:
   a left side crawler 5a and a right side crawler 5b as traveling devices;
   an undercarriage 2 including a left side motor 60a and a right side motor 60b, the left side motor 60a and the right side motor 60b independently driving the left side crawler 5a and the right side crawler 5b, respectively; and
   a deck 4 configured to move up and down above the undercarriage 2, the traveling operation device 10 including:
  a control panel 11 disposed on the deck 4; and
  a controller 70 that controls rotations of the left side motor 60a and the right side motor 60b according to an operation of an operation rod 20 disposed on the control panel 11,
the operation rod 20 including:
  an operation rod main body 21 that is capable of tilting only in a front-rear axis direction from a neutral position and that is configured to perform operations of advance, retreat, and stop of the aerial work platform 1 in response to the tilt in the front-rear axis direction;
  a left turning switch 24 configured to perform an operation of turning the aerial work platform 1 in a left direction;
  a right turning switch 25 configured to perform an operation of turning the aerial work platform 1 in a right direction; and
  an enable switch 22 that is configured of a momentary switch and that enables an operation performed on the operation rod main body 21 and an operation performed on the left turning switch 24 and the right turning switch 25 only while the enable switch 22 is pressed, and
the left turning switch 24, the right turning switch 25, and the enable switch 22 being disposed on the operation rod main body 21 at positions capable of operating the operation rod main body 21, the left turning switch 24, and/or the right turning switch 25 while the enable switch 22 is pressed with a finger of a hand gripping the operation rod main body 21.

Preferably, the enable switch 22 is disposed (as a trigger switch, for example) on a side surface on a front side of a grip portion 26 of the operation rod main body 21.

The left turning switch 24 and the right turning switch 25 may be disposed next to each other in a left-right direction on a top surface of the grip portion 26 of the operation rod main body 21.

The controller 70 may be configured to have a memory area 71 for storing basic rotation speeds that are respective rotation speeds common to the left side motor 60a and the right side motor 60b and that correspond to a neutral position, a front inclination position, and a rear inclination position of the operation rod main body 21, and for storing correction values of the rotation speeds of the left side motor 60a and the right side motor 60b on a basis of the basic rotation speeds, the correction value being applied when the aerial work platform 1 turns left or right in response to a state of operating the left turning switch 24 and the right turning switch 25,
  the left side motor 60a and the right side motor 60b are rotated at the basic rotation speed corresponding to a tilt position in a case where the left turning switch 24 and the right turning switch 25 are not operated but only a tilt operation is performed on the operation rod main body 21 in response to the operations performed on the operation rod main body 21 and the left turning switch 24 or the right turning switch 25 while the enable switch 22 is pressed, and
  when the left turning switch 24 or the right turning switch 25 is operated, the basic rotation speed is corrected by using the correction value and the rotation speeds of the left side motor 60a and the right side motor 60b are controlled in such a manner that the aerial work platform 1 makes a turning movement.

The controller 70 may be configured to include an operation amount counter 72 configured to count amounts of operations of the left turning switch 24 and the right turning switch 25,
  the memory area 71 of the controller 70 stores the correction value that varies depending on a number of counts obtained by the operation amount counter 72,
  the aerial work platform 1 turns left by correcting the basic rotation speed in such a manner that the rotation speed of the left side motor 60a decreases (including reverse rotation) and/or the rotation speed of the right side motor 60b increases when the number of counts changes with increase in the amount of operation of the left turning switch 24, and
  the aerial work platform 1 turns right by correcting the basic rotation speed in such a manner that the rotation speed of the right side motor 60b decreases (including reverse rotation) and/or the rotation speed of the left side motor 60a increases when the number of counts changes with increase in the amount of operation of the right turning switch 25.

The operation amount counter 72 may be configured to count pressing duration of the left turning switch 24 and the right turning switch 25 as an operation amount, or count the number of presses on the left turning switch 24 and the right turning switch 25 as an operation amount.

Moreover, it may be configured that the memory area 71 of the controller 70 stores both the correction value to be used when the operation rod main body 21 is at the neutral position and the correction value to be used when the operation rod main body 21 is at the front inclination position or the rear inclination position,
  the controller 70 performs control in such a manner that the basic rotation speed is corrected (allowing the aerial work platform to perform spin turn) to obtain a predetermined rotation speed that causes the left side motor 60a and the right side motor 60b to operate at a same rotation speed in mutually opposite rotation directions when the left turning switch 24 or the right turning switch 25 is pressed in a state where the operation rod main body 21 is at the neutral position,
  the aerial work platform 1 turns left by correcting the basic rotation speed in such a manner that the rotation speed of the left side motor 60a decreases when the left turning switch 24 is pressed in a state where the operation rod main body 21 is inclined forward or backward, and
  the aerial work platform 1 turns right by correcting the basic rotation speed in such a manner that the rotation speed of the right side motor 60b decreases when the right turning switch 25 is pressed in a state where the operation rod main body 21 is inclined forward or backward.

In such case, the controller 70 may correct the basic rotation speed (allowing the aerial work platform to perform spin turn) in such a manner that the rotation speed of the left side motor 60a decreases to zero (stop) when the left turning switch 24 is pressed in a state where the operation rod main body 21 is inclined forward or backward, and
  the controller 70 corrects the basic rotation speed in such a manner that the rotation speed of the right side motor 60b decreases to zero (stop) when the right turning switch 25 is pressed in a state where the operation rod main body 21 is inclined forward or backward.

Alternatively, the controller 70 may be configured to correct the basic rotation speed in such a manner that the rotation speed of the left side motor 60a gradually decreases to zero with increase in an amount of tilt of the operation rod main body 21 from the neutral position when the left turning switch 24 is pressed in a state where the operation rod main body 21 is inclined forward or backward, and the controller 70 corrects the basic rotation speed in such a manner that the rotation speed of the right side motor 60b gradually decreases to zero with increase in an amount of tilt of the operation rod main body 21 from the neutral position when the right turning switch 25 is pressed in a state where the operation rod main body 21 is inclined forward or backward.

Effect of the Invention

The configuration of the present invention that has been described above has allowed to obtain the following remarkable effects from the aerial work platform 1 including the traveling operation device 10 of the present invention.

The operation rod main body 21 is provided with the operation rod 20 on which the enable switch 22, the left turning switch 24, and the right turning switch 25 are disposed at positions capable of operating the enable switch 22, the left turning switch 24, and the right turning switch 25 with a hand gripping the operation rod main body 21. This makes it possible to provide the traveling operation device 10 that allows the operator to perform all the operations of advance, retreat, and turn of the aerial work platform 1 with one hand by using a lever (operation rod main body 21) that swings only in the front-rear axis direction.

In the traveling operation device including the operation lever tiltable in biaxial directions of the front-rear direction and the left-right direction as disclosed in Patent Document 2 listed above, the operation lever is swayed in the left-right direction, and this makes it difficult to stably move the aerial work platform straight ahead if the traveling operation device is employed in a drive operating device of the crawler-type aerial work platform that generates large vibration during traveling. However, because the operation rod main body 21 is tiltable only in the front-rear axis direction as described above, the operation rod 20 disposed on the control panel 11 of the present invention employs the uniaxial operation rod main body 21, and this makes it possible to provide the traveling operation device 10 including the control panel 11 that allows the aerial work platform 1 to stably travel straight without being swayed in the left-right direction due to vibration as described above.

In addition, the traveling operation device 10 of the present invention including the above-described control panel 11 allows the operator to drive the aerial work platform 1 with one hand. As a result, an operator can drive the aerial work platform 1 in a state where a body is supported by, for example, holding on to a safety barrier 40 or the like by the empty hand. This has allowed reducing risk, such as falling on the deck 4.

Moreover, by making it possible to operate the control panel 11 with one hand in this way, although it has the configuration including the enable switch 22 described above, even when the control panel 11 is removed from the deck 4 and operate the operation rod 20 in a state of which the operator holds the control panel 11 in the arm, the operator can operate the operation rod 20 with one hand, and as a result, the control panel 11 of the present invention can be used also as a remote control used for remotely driving the aerial work platform 1.

When the enable switch 22 is disposed as a trigger switch on a side surface on a front side of the grip portion 26 of the operation rod 20, it is possible for the operator to operate the enable switch 22 naturally and extremely easily while gripping the operation rod 20 without having an unnatural hand posture. This can reduce operator fatigue.

In the configuration in which the left turning switch 24 and the right turning switch 25 are disposed next to each other in the left-right direction on the top surface of the grip portion 26 of the operation rod 20, it is possible to simultaneously operate the enable switch 22 and the left turning switch 24 or the right turning switch 25 with no effort, and this allows the operator to simultaneously operate the plurality of switches with one hand without having an unnatural hand posture. This makes it possible to provide the control panel 11 that can be operated by the operator without excessive fatigue.

Moreover, buttons are arranged in conformity with turning directions because the left turning switch 24 and the right turning switch 25 are disposed next to each other in the left-right direction. This allows the operator to intuitively perform a travel operation, and the aerial work platform can be easily driven even by an inexperienced operator.

In addition, it is possible to provide the traveling operation device 10 in which when the memory area 71 of the controller 70 stores the above-described basic rotation speeds and correction values of the basic rotation speeds and the controller 70 controls rotation speeds of the left side motor 60a and the right side motor 60b in response to operations performed on the operation rod main body 21, the left turning switch 24, and the left turning switch 25 while the enable switch 22 is pressed, the aerial work platform 1 can be caused to travel in response to an operation of the operation rod 20 disposed on the control panel 11.

In the configuration in which the controller 70 includes the operation amount counter 72 configured to count amounts of operations of the left turning switch 24 and the right turning switch 25 and the memory area 71 of the controller 70 stores the correction value that varies depending on the number of counts obtained by the operation amount counter 72, it is possible to easily perform control in such a manner that turning angles vary in response to the amounts of the operations (pressing duration or the number of presses) of the left turning switch 24 and the right turning switch 25 when the controller 70 performs control to correct the basic rotation speeds in response to the amounts of the operations (pressing duration or the number of presses) of the left turning switch 24 and the right turning switch 25 in such a manner that a difference in speed between the left side motor 60a and the right side motor 60b increases with the increase in the amounts of the operations.

Note that, such turning angles may vary depending on the pressing duration or the number of presses of the left turning switch or the right turning switch.

In addition, it is possible to easily switch between the spin turn and another turning movement in the configuration in which the memory area 71 of the controller 70 stores both the correction value to be used when the operation rod main body 21 is at the neutral position and the correction value to be used when the operation rod main body 21 is at the front inclination position or the rear inclination position, the controller 70 performs control in such a manner that the basic rotation speeds are corrected to obtain predetermined rotation speeds that cause the left side motor 60a and the right side motor 60b to operate at a same rotation speed in mutually opposite rotation directions when the left turning switch 24 or the right turning switch 25 are pressed in a state where the operation rod main body 21 is at the neutral position, the controller 70 corrects the basic rotation speed in such a manner that the rotation speed of the left side motor 60a decreases when the left turning switch 24 is pressed in a state where the operation rod main body 21 is inclined forward or backward, and the controller 70 corrects the basic rotation speed in such a manner that the rotation speed of the right side motor 60b decreases when the right turning switch 25 is pressed in a state where the operation rod main body 21 is inclined forward or backward.

In this configuration, the basic rotation speeds are corrected in such a manner that the rotation speed of the left side motor 60a becomes zero (0) in the case where the left turning switch 24 is operated while a tilt operation is performed on the operation rod main body 21, and the rotation speed of the right side motor 60b becomes zero (0) in the case where the right turning switch 25 is operated while the tilt operation is performed on the operation rod main body 21. This allows the aerial work platform to make the pivot turn by setting the left side crawler or the right side crawler as a supporting point.

In addition, by correcting the basic rotation speed in such a manner that the basic rotation speed decreases depending on the amount of tilt of the operation rod main body 21, it is possible to gradually change a turning state from a turning movement made during traveling to a pivot turn made on the spot while the left side crawler or the right side crawler is stopped.

EMBODIMENTS FOR CARRYING OUT THE INVENTION

The following will describe a configuration of the present invention with reference to the attached drawings.

[Overall Configuration of Aerial Work Platform]

Figure 1:
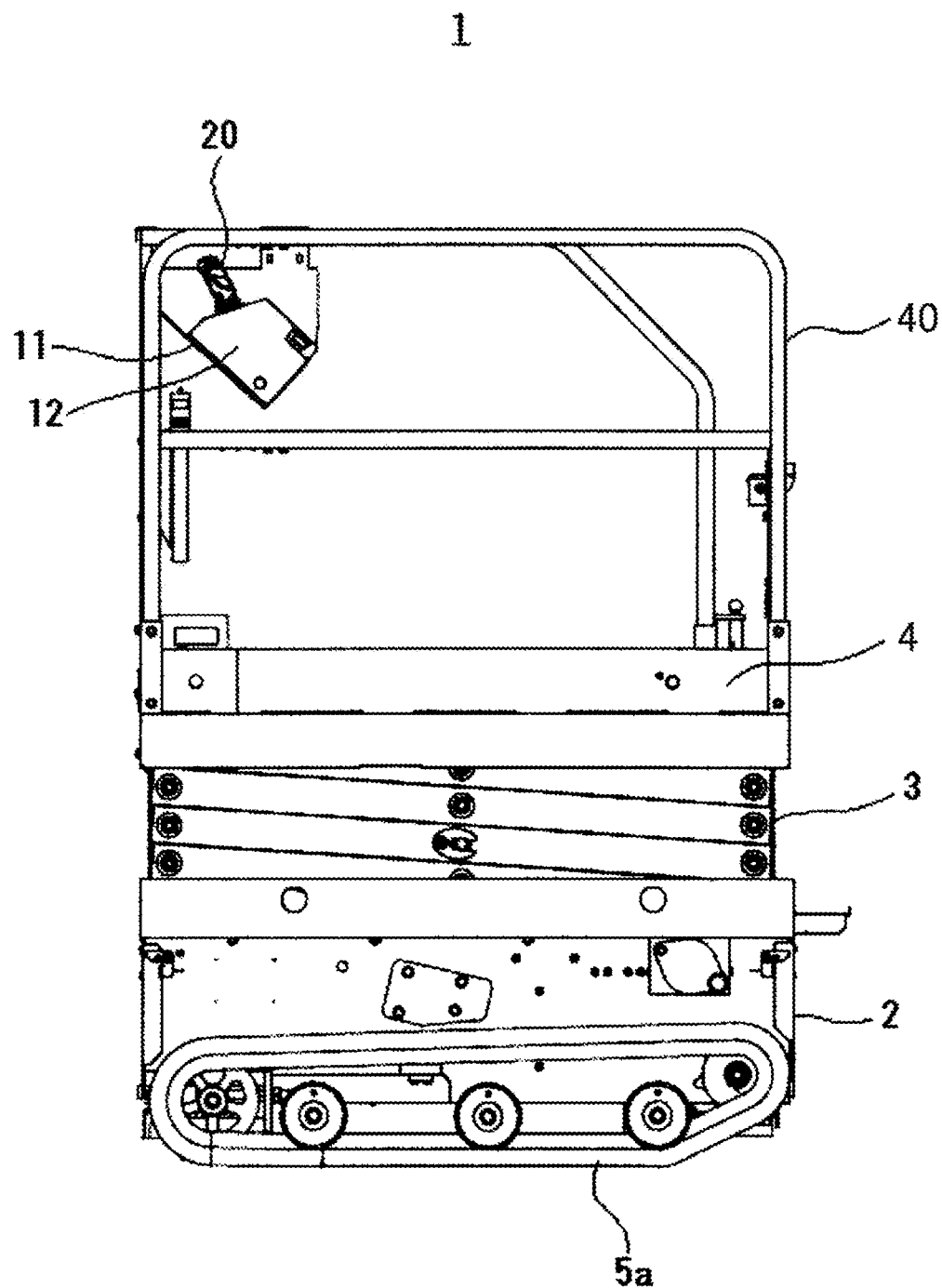
FIG. 1 is a side view of an aerial work platform that includes a traveling operation device of the present invention.
Figure 2:
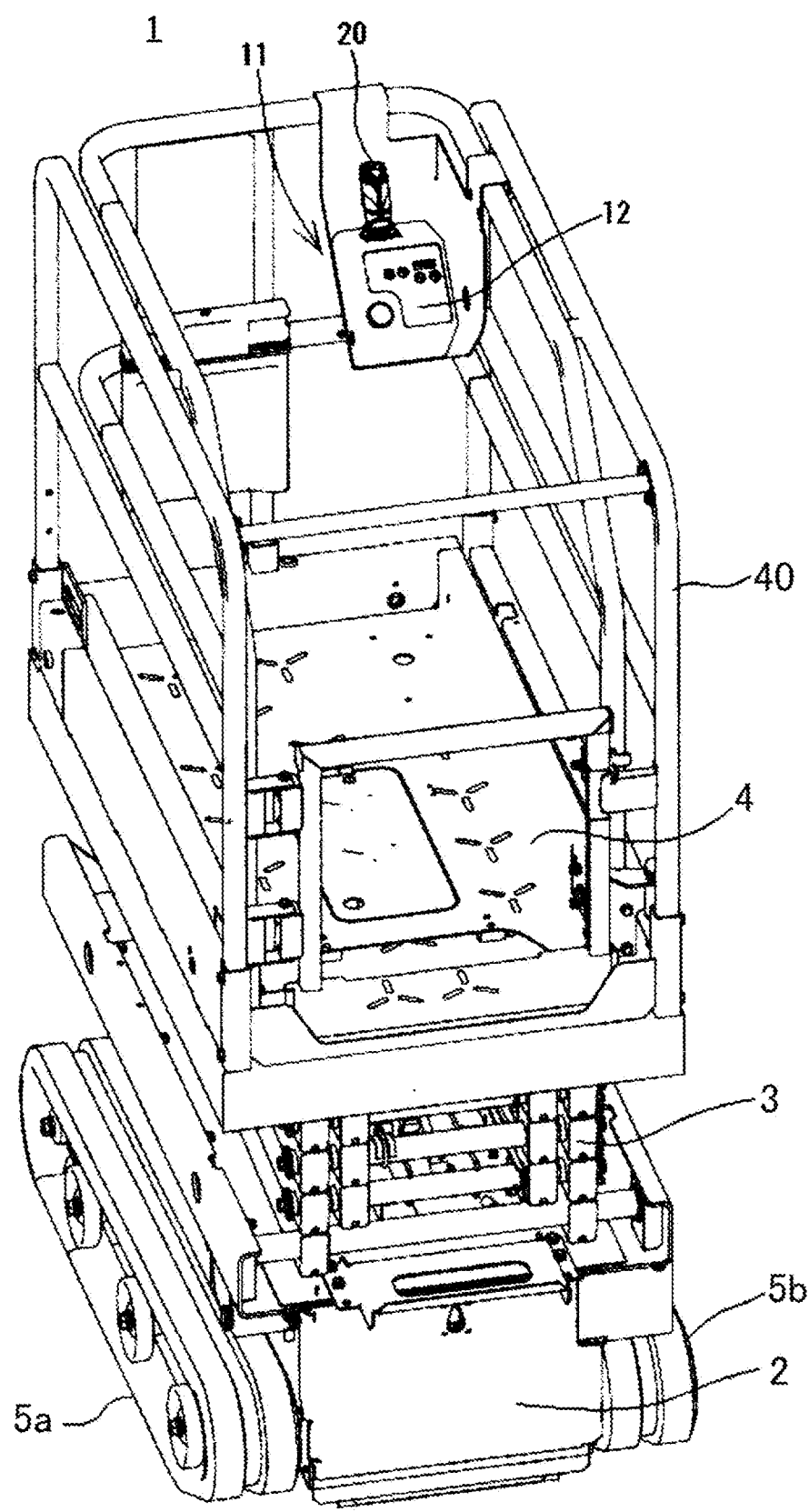
FIG. 2 is a perspective view of the aerial work platform including the traveling operation device of the present invention.

In FIG. 1 and FIG. 2, reference numeral 1 denotes a crawler-type aerial work platform that includes a traveling operation device 10 of the present invention. The aerial work platform 1 includes crawlers 5, an undercarriage 2, and a deck 4. The respective crawlers 5 (a left side crawler 5a and a right side crawler 5b) are traveling devices disposed on both sides in a width direction. The undercarriage 2 includes a left side motor 60a and a right side motor 60b (see FIG. 3) that drive the respective left side and right side crawlers 5a, 5b. The deck 4 above the undercarriage 2 moves up and down via an elevating mechanism 3 formed of a scissors link mechanism.

For example, by disposing a safety barrier 40 on the deck 4, falling of, for example, an operator and luggage ride on the deck 4 is prevented.

Figure 4:
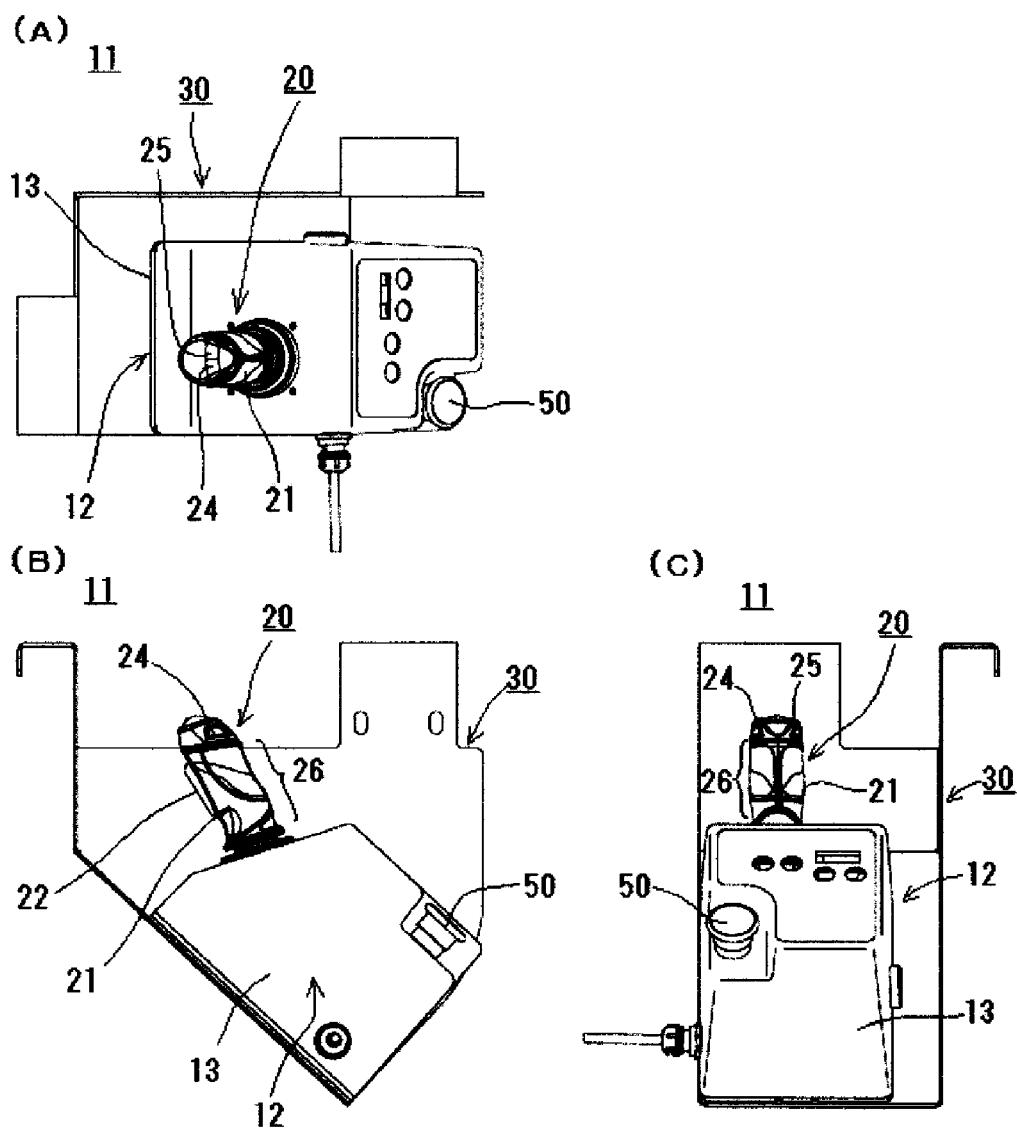
FIG. 4A is a plan view of a control panel disposed in the traveling operation device of the present invention.
FIG. 4B is a left side view of a control panel disposed in the traveling operation device of the present invention.
FIG. 4C is a back view of a control panel disposed in the traveling operation device of the present invention.

In the embodiment illustrated in the drawings, as one example of the aerial work platform 1 that includes the traveling operation device 10 of the present invention, the aerial work platform 1 having the structure configured to move up and down the deck by the elevating mechanism 3 formed of the scissors link mechanism has been described, however the aerial work platform 1 to which the traveling operation device 10 of the present invention is applied is applicable to the various kinds of known aerial work platforms including elevating mechanisms, such as the aerial work platform as described in Patent Document 1 (see FIG. 1 in Patent Document 1) described above in which a box-shaped deck is installed to a crane distal end of a crane truck to be movable up and down, and an aerial work platform as described in Patent Document 2 (see FIG. 4 of Patent Document 2) in which a deck can be moved up and down with a mast having a telescopic structure that is perpendicularly disposed upright on an undercarriage and vertically extends.

[Traveling Operation Device]

Figure 3:
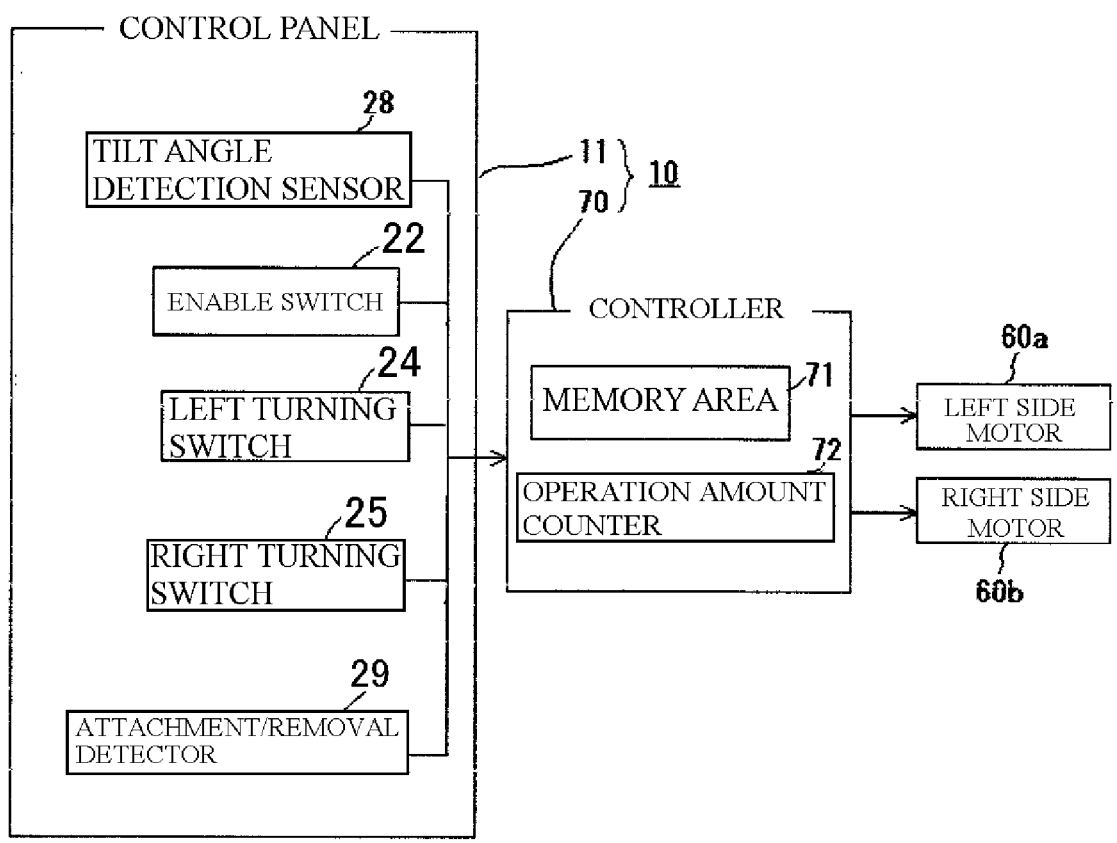
FIG. 3 is a function block diagram of the aerial work platform including the traveling operation device of the present invention.

As illustrated in FIG. 3, the traveling operation device 10 of the crawler-type aerial work platform 1 configured as described above includes a control panel 11 operated by the operator and a controller 70 that controls rotations of the left side motor 60a and the right side motor 60b according to ON and OFF of an enable switch 22 described later, a detection signal obtained from the tilt angle detection sensor 28 detecting the tilt angle of the operation rod main body 21, and ON and OFF of a left turning switch 24 and a right turning switch 25 disposed on the control panel 11.

[Control Panel]

(1) Overall Configuration

As illustrated in FIG. 1 and FIG. 2, the control panel 11 among them is disposed at a position, such as installation in the proximity of the upper end of the safety barrier 40 disposed on the deck 4 of the aerial work platform 1, where the operator who rides on the deck 4 can operate the control panel 11. Operating the operation rod 20 disposed on the control panel 11 allows performing respective operations of advance, retreat, stop and turn of the aerial work platform 1.

As illustrated in FIG. 3, various kinds of operation commands input via the control panel 11 are input to the controller 70, which will be described later, configured of an electronic control device, such as a microcontroller. The controller 70 controls the rotations of the left side motor 60a and the right side motor 60b to ensure the travel operation (driving) of the aerial work platform 1 in accordance with the operation of the control panel 11 by the operator.

As illustrated in FIG. 4(A) to FIG. 4(C) and FIG. 5, the control panel 11 includes a control panel main body 12, the operation rod 20, and a bracket 30. The control panel main body 12 is formed by housing components in a casing 13. The operation rod 20 is disposed on the control panel main body 12 to perform the travel operation of the aerial work platform 1. With the bracket 30, the control panel main body 12 is installed to the safety barrier 40.

In the embodiment illustrated in the drawings, the control panel main body 12 includes only the above-described operation rod 20 and an emergency stop switch indicated by reference numeral 50 as a lever, a switch, and the like to operate the aerial work platform 1. However, the control panel main body 12 may further include a switch, a lever, and the like to cause the elevating mechanism 3 to perform the elevating operation of the deck 4. Alternatively, it may be configured that a selector switch to switch between the travel operation and the elevating operation may be disposed, and when the elevating operation is selected with the selector switch, the elevating operation of the deck can be performed by the operation of the operation rod 20.

(2) Operation Rod

The above-described operation rod 20 disposed on the control panel 11 includes an operation rod main body 21, an enable switch 22 installed to the operation rod main body 21, the left turning switch 24 and the right turning switch 25.

The operation rod main body 21 among them is configured swingably in the front-rear axis direction starting from the neutral position. The aerial work platform 1 is advanced by tilting the operation rod main body 21 forward. The aerial work platform 1 is retreated by tilting the operation rod main body 21 backward. The aerial work platform 1 is stopped by returning the operation rod main body 21 to the neutral position.

In the operation rod main body 21, a grip rubber or the like is installed to a part gripped by the operator to form a grip portion 26, and the operator grips the grip portion 26 to perform the tilt operation on the operation rod main body 21, thereby it is possible to cause the aerial work platform to make the above-described movements of advance, retreat, stop, and the like.

As described above, the operation rod main body 21 includes the enable switch 22, the left turning switch 24, and the right turning switch 25. The enable switch 22 among them is configured of a momentary type switch. The travel operations performed in response to the tilt of the operation rod main body 21, and the turning operations (to be described later) performed in response to the operation of the left turning switch 24 or the right turning switch 25 are enabled only while the user presses the enable switch 22.

In addition, the above-described left turning switch 24 is a switch configured to instruct the controller 70 (to be described later) to perform the rotation control of the left side motor 60*a* for turning the aerial work platform to the left. The above-described right turning switch 25 is a switch configured to instruct the controller 70 (to be described later) to perform the rotation control of the right side motor 60*b* for turning the aerial work platform to the right. When the left turning switch 24 or the right turning switch 25 is operated, the controller 70 controls the rotations of the left side motor 60*a* and the right side motors 60*b* in accordance with a preliminarily decided correspondence relationship. The aerial work platform makes a left turn in the case where the left turning switch 24 is operated. The aerial work platform makes a right turn in the case where the right turning switch 25 is operated.

Here, the left turn means a travel state in which the rotation speed of the left side motor 60*a* is slow (including stop) relative to the rotation speed of the right side motor 60*b* that rotates in a traveling direction designated by the tilt of the operation rod main body 21, or the left side motor 60*a* rotates in an opposite direction from the rotation direction of the right side motor 60*b*.

In addition, the right turn means a travel state in which the rotation speed of the right side motor 60*b* is slow (including stop) relative to the rotation speed of the left side motor 60*a* that rotates in the traveling direction designated by the tilt of the operation rod main body 21, or the right side motor 60*b* rotates in an opposite direction from the rotation direction of the left side motor 60*a*.

Note that, in the configuration in which the spin turn is made independently of the tilt movement of the operation rod main body 21, the left turn means a turn in an anticlockwise direction in plan view of the aerial work platform, and the right turn means a turn in a clockwise direction in plan view of the aerial work platform.

Similarly to the above-described enable switch 22, the left turning switch 24 and the right turning switch 25 may be configured of momentary type switches. However, the left turning switch 24 and the right turning switch 25 are not limited to the momentary type switches. For example, the left turning switch 24 and the right turning switch 25 may be configured of push-pull switches in which push-button switches are used, are held in a pressed state when being pushed once, and are released from the pressed state and return to initial positions (slow speed stages) when being pushed twice.

The above-described enable switch 22, the left turning switch 24, and the right turning switch 25 are all disposed at positions on the operation rod main body 21 that allow the operator to simultaneously press the switches with fingers of a hand gripping the grip portion 26 in the state where the operator is gripping the grip portion 26 of the operation rod main body 21.

In this embodiment, as illustrated in FIG. 4B, the above-described enable switch 22 is disposed on a side surface on the front side of the grip portion 26 of the operation rod main body 21 as a trigger switch. By gripping the grip portion 26 with a ball of a finger on the enable switch 22, while the enable switch 22 is pressed, the operation rod main body 21 can be gripped.

In addition, in this embodiment, as illustrated in FIG. 4(A) to FIG. 4(C) and FIG. 5, the above-described left turning switch 24 and right turning switch 25 are disposed next to each other in the left-right direction on a top surface of the grip portion 26 of the operation rod main body 21. In this case, it is easy to selectively operate the left turning switch 24 or the right turning switch 25 with a thumb in a state where the grip portion 26 is gripped and the enable switch 22 is pressed (gripped).

(3) Control Panel Main Body

The above-described casing 13 of the control panel main body 12 provided with the operation rod 20 houses equipment such as various kinds of sensors and electronic control devices necessary for taking out the travel operation of the aerial work platform 1 input through the operation of the above-described operation rod 20 as an electric signal.

Examples of the equipment housed in the above-described casing 13 include the tilt angle detection sensor 28. The tilt angle detection sensor 28 is coupled to a lower end portion of the operation rod main body 21 inserted in the casing 13 in such a manner that the operation rod main body 21 penetrates the casing 13, and is configured to detect a tilt angle of the operation rod main body 21 in the front-rear direction.

In the above-described casing 13, biasing means (not illustrated) that biases the operation rod main body 21 to return the operation rod main body 21 to the neutral position is disposed. When the operation rod main body 21 is released from a state of being tilted in any of the front, rear directions, the operation rod main body 21 automatically returns to the neutral position.

The above-described tilt angle detection sensor 28 is configured to detect the tilt angle of the operation rod main body 21 in the front-rear direction. The controller 70 causes the aerial work platform 1 to advance, retreat, and turn (including pivot turn and spin turn) by controlling rotations of the left side motor 60a and the right side motor 60b disposed in the undercarriage depending on the tilt angle detected by the tilt angle detection sensor 28 and a situation of operating the above-described left turning switch 24 and the right turning switch 25.

Note that, in the above-described example, the tilt angle detection sensor 28 has been described as one for detecting the tilt angle of the operation rod main body 21. However, instead of such a configuration, it is possible to provide a sensor (not illustrated) that does not detect the tilt angle of the operation rod main body 21 but detects only a tilt direction (front inclination, rear inclination, or neutral). Such a sensor may be configured to detect that the operation rod main body 21 is in a front inclination state when the operation rod main body 21 is tilted forward at a certain angle or more, detect that the operation rod main body 21 is in a rear inclination state when the operation rod main body 21 is tilted backward at a certain angle or more, and detect that the operation rod main body 21 is in a neutral state in the other cases.

(4) Bracket

Figure 5:
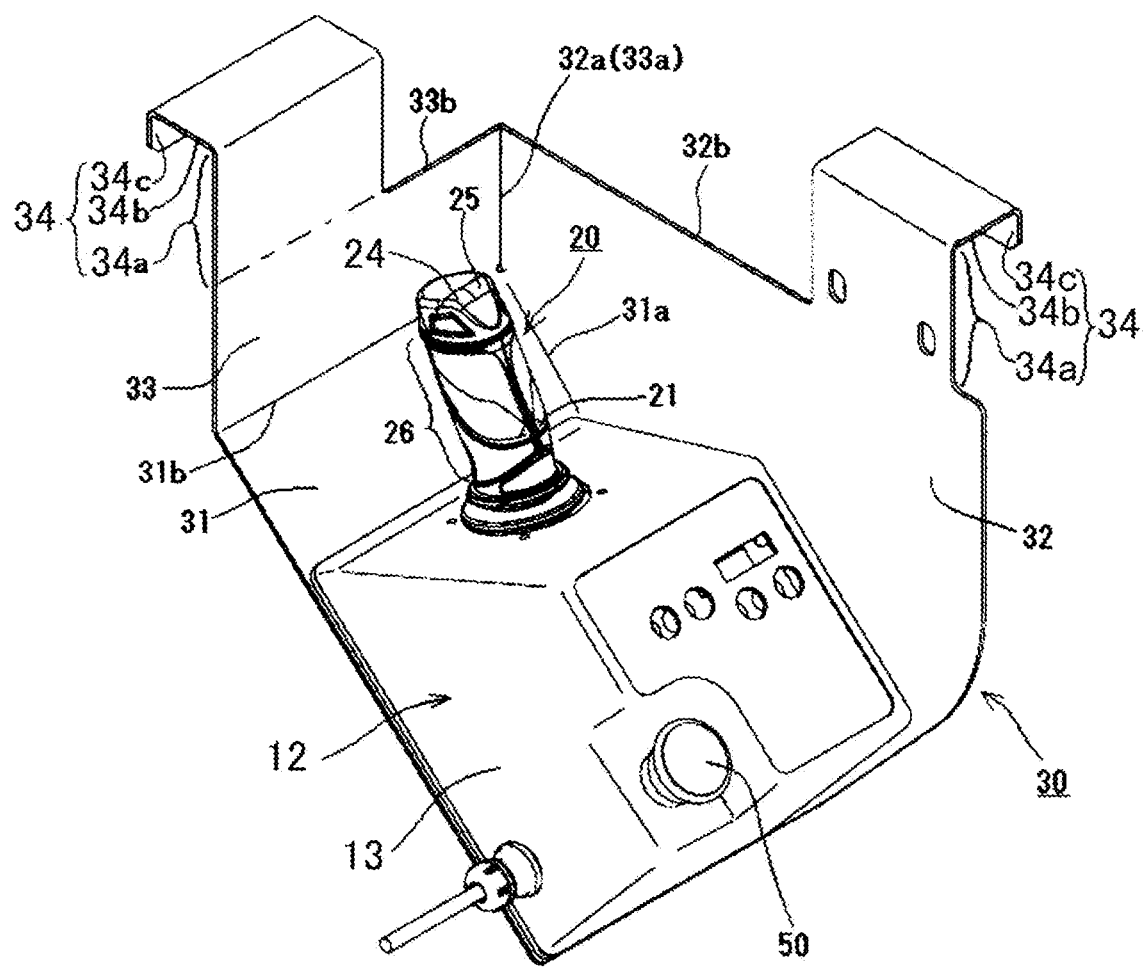
FIG. 5 is a perspective view of the control panel disposed in the traveling operation device of the present invention.

As the above-described bracket 30 to install the above-described control panel main body 12 to the safety barrier 40, in this embodiment, as illustrated in FIG. 5, a back surface plate 31 that forms an inclined surface on which the back surface of the control panel main body 12 is placed, a side surface plate 32 disposed upright in a perpendicular direction on one side 31a in the width direction of the back surface plate 31, and a front surface plate 33 disposed upright in a perpendicular direction on an upper end side 31b of the back surface plate 31 are provided. One side 33a in the width direction of the front surface plate 33 is orthogonally coupled to one side 32a in a height direction of the side surface plate 32.

In each of an upper end side 33b of the front surface plate 33 and an upper end side 32b of the side surface plate 32, a suspension metal fitting 34 formed of a suspension piece 34a that projects upward, a lock piece 34b that projects outward from an upper end of the suspension piece 34a in the horizontal direction, and a collar portion 34c that projects downward from the other end edge of the lock piece 34b are disposed. By inserting and fitting the upper end portion of the safety barrier 40 disposed upright on the deck 4 into the U-shaped parts opening downward surrounded by the upper end portions of the suspension pieces 34a, the lock pieces 34b, and the collar portions 34c of the suspension metal fittings 34, the control panel 11 can be installed in the proximity of the upper end of the safety barrier 40 in a suspended state.

In this embodiment, with the above-described suspension metal fittings 34, the control panel 11 can be installed to the corner portion of the safety barrier 40. By only hooking the two suspension metal fittings 34, 34 on the upper end portion of the safety barrier 40, without fixing, such as fastening with a bolt, the control panel 11 can be installed so as not to, for example, move the control panel 11 on the safety barrier 40, and by only lifting the control panel 11, the control panel 11 can be easily removed from the safety barrier 40.

In the embodiment illustrated in the drawing, the configuration in which the control panel main body 12 can be removed from the safety barrier 40 of the deck 4 integrally with the bracket 30 has been described. Instead of the configuration, for example, as a configuration in which the above-described bracket 30 is fixedly secured to the safety barrier 40 by a method, such as fastening with a bolt, and the control panel main body 12 is installed to the bracket 30 to be removably attachable, when the control panel main body 12 is removed from the safety barrier 40, any component of the control panel 11 including the bracket 30 and accessories disposed in the bracket 30 as a part of the control panel 11 (for example, attachment/removal detector 29 described later in a case of installation to the safety barrier 40 side) may remain on the safety barrier 40 side of the deck 4.

Note that the control panel 11 of the present invention can include the attachment/removal detector 29 (see FIG. 3) that detects the attachment/removal state of the control panel main body 12 to the safety barrier 40. As described above, in the embodiment illustrated in the drawing in which the bracket 30 is removed from the safety barrier 40 integrally with the control panel main body 12, the following configuration may be employed. As one example, a limit switch, a proximity sensor, or the like is disposed as the attachment/removal detector 29 on, for example, the above-described lock piece 34b of the suspension metal fitting 34 of the bracket 30. When the suspension metal fittings 34 are hooked on the upper end portion of the safety barrier 40, the attachment/removal detector 29 detect the presence of the upper end portion of the safety barrier 40, and the above-described attachment/removal detector 29 can detect that the control panel 11 is installed to the safety barrier 40 or is removed.

As long as the attachment/removal of the control panel 11 can be detected, the above-described attachment/removal detector 29 is not limited to the configuration of being disposed on the bracket 30 side and may be disposed on the safety barrier 40 side.

As described above, in the configuration in which the control panel main body 12 is removably attachable to the bracket 30, the attachment/removal detector 29 may be disposed on the control panel main body 12 side, or may remain on the safety barrier 40 side together with the bracket 30 when the attachment/removal detector 29 is disposed on the bracket 30 side and the control panel main body 12 is removed.

A detection signal that thus has detected the attachment/removal state of the control panel 11 to the safety barrier 40 is input to the controller 70, and when the control panel 11 is removed from the safety barrier 40 and used. The controller 70 may apply a predetermined decelerated travel speed to a travel speed applied when the control panel 11 installed to the safety barrier is used.

(5) Operation Method of Control Panel or the Like

Figure 6:
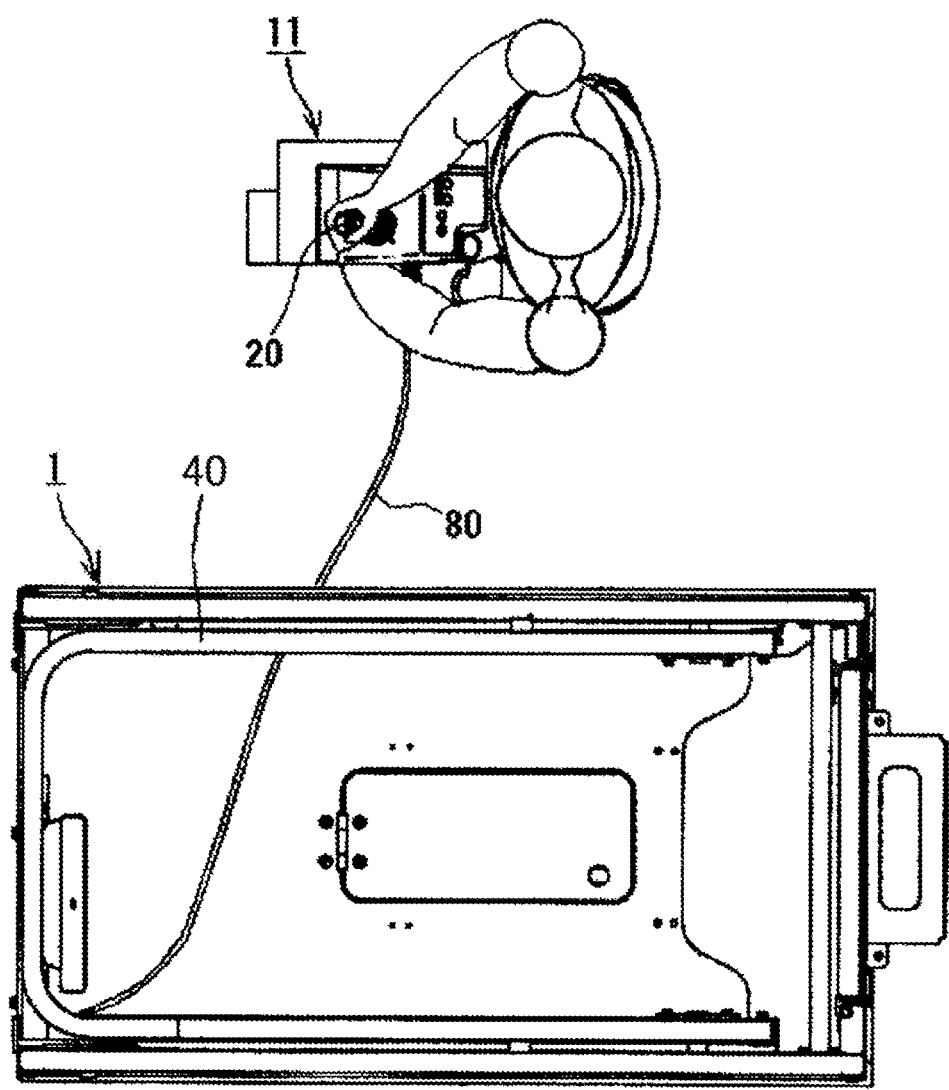
FIG. 6 is a plan view illustrating a use state with the control panel (a control panel main body) removed.

Not only that the control panel 11 disposed in the traveling operation device 10 of the present invention configured as described above is usable in the state of being installed to the safety barrier 40 of the deck 4 similarly to the known control panel, the control panel main body 12 can be removed from the safety barrier 40, carried to outside the deck 4, and used as a remote control for remote travel of the aerial work platform 1 (see FIG. 6).

In use according to any aspect, when the operator grips the grip portion 26 of the operation rod main body 21 such that the enable switch 22 disposed as the trigger switch contacts the ball of the finger, the enable switch 22 is pressed. In view of this, driving operations are enabled based on the tilt of the operation rod main body 21 and the operations of the left turning switch 24 and the right turning switch 25.

In such a state, the operator can tilt the operation rod main body 21 forward or backward to advance or retreat the aerial work platform and operate the left turning switch 24 or the right turning switch 25 to turn the aerial work platform 1. Any travel operation can be performed with one hand.

In the case of using the control panel main body 12 while the control panel main body 12 is attached to the safety barrier 40, the operator operates the operation rod 20 in a state of being swayed in the left-right direction due to vibration occurring during traveling. However, the operator can move the aerial work platform 1 straight ahead without being wobbled regardless of such vibration because the operation rod main body 21 is configured to be tiltable only in the front-rear axis direction. Moreover, it is possible to perform the left turn operation and the right turn operation with one hand because the left turning switch 24 and the right turning switch 25 are disposed on the operation rod main body 21.

As illustrated in FIG. 6, in a case where the control panel main body 12 is removed from the safety barrier 40 and used as the remote control, the operator performs the operation with the control panel main body 12 held in the arm. However, as described above, since the operation rod 20 disposed in the control panel main body 12 is designed such that the operator can easily operate by one hand, even when the control panel main body 12 is held in the arm, the travel operation of the aerial work platform 1 can be easily performed by one hand.

Thus, the control panel main body 12 can be removed from the safety barrier 40 and used as the remote control. Therefore, although in use for usual application, the control panel main body 12 is installed to the safety barrier 40 and the operator performs the driving as in conventional case. In a case where driving while a person is onboard is risky, such as traveling when the aerial work platform 1 is loaded onto or unloaded from a vehicle carrier car, such as a self loader and a safety loader, and traveling when loading or unloading is performed on a loading platform of a motor truck using a loading ramp (an on-board slope), or the similar case, or in a case where the aerial work platform 1 is caused to pass through a location difficult to pass through (a height is low) while the operator rides on the deck 4, such as an entrance of an elevator when the aerial work platform 1 is loaded on the elevator and carried for use for a building work, without the riding of the operator on the deck 4, the operation rod 20 disposed on the control panel main body 12 can be operated outside the deck 4 for traveling.

[Controller]

(1) Overall Configuration

The traveling operation device 10 of the crawler-type aerial work platform 1 of the present invention includes, in addition to the above-described control panel 11, the controller 70 configured of an electronic control device, such as a microcontroller, as illustrated in FIG. 3. The controller 70 receives a tilt angle detection signal of the operation rod main body 21 detected by the tilt angle detection sensor 28 disposed in the control panel 11, and ON and OFF signals of the left turning switch 24 and the right turning switch 25, and controls the rotations of the left side motor 60*a* and the right side motor 60*b* in accordance with a preliminarily stored correspondence relationship.

With the rotation control of the left side motor 60*a* and the right side motor 60*b* by the controller 70, the aerial work platform 1 can make predetermined traveling movements including advance, retreat, stop, and turn in response to an input operation performed on the control panel 11 by the operator.

Note that in the embodiment illustrated in FIG. 3, the controller 70 is illustrated as a component different from the above-described control panel 11, however the controller 70 may be housed in the above-described casing 13 of the control panel 11 together with the tilt angle detection sensor 28 and the like as one of the components in the control panel 11.

In order to control the above-described rotations of the left side motor 60*a* and the right side motor 60*b* in response to a detection signal obtained from the tilt angle detection sensor 28 configured to detect a movement of the operation rod main body 21 and the ON and OFF signals in accordance with the operations of the left turning switch 24 and the right turning switch 25, the memory area 71 of the controller 70 stores "basic rotation speed information" and "correction information". The "basic rotation speed information" is information for defining preset rotation speeds (basic rotation speeds) that are common to the left side motor 60*a* and the right side motor 60*b* according to tilt positions of the operation rod main body 21 (detection signals obtained from the tilt angle detection sensor 28). The "correction information" is information for defining correction values of the basic rotation speeds that are necessary for the aerial work platform 1 to make a turning movement in response to the operation of the left turning switch 24 and the right turning switch 25.

(2) Basic Rotation Speed Information (2-1) Overview

The memory area 71 of the controller 70 stores the "basic rotation speed information" for defining a correspondence relationship between the tilt positions of the operation rod main body 21 detected by the tilt angle detection sensor 28 and the basic rotation speeds that are the rotation speeds common to the left side motor 60*a* and the right side motor 60*b* in accordance with the tilt positions of the operation rod main body 21.

Here, the "basic rotation speed" is defined as the common rotation speed that should be employed by the left side motor 60*a* and the right side motor 60*b* in a state where the left turning switch 24 and the right turning switch 25 are not operated. Therefore, the controller 70 applies the basic rotation speed to both of the left side motor 60*a* and the right side motor 60*b* depending on the tilt position of the operation rod main body 21 in the case where a tilt operation is performed on the operation rod main body 21 in the state where the left turning switch 24 and the right turning switch 25 are not operated.

Accordingly, the aerial work platform 1 is advanced in a straight direction in the case where the front inclination operation is performed on the operation rod main body 21 in the state where the left turning switch 24 and the right turning switch 25 are not operated. The aerial work platform 1 is retreated in the straight direction in the case where the rear inclination operation is performed on the operation rod main body 21. The aerial work platform 1 is stopped in the case where the operation rod main body 21 is at the neutral position.

Note that the basic rotation speed information does not have to be stored as the "rotation speed" in the memory area 71 of the controller 70. For example, the basic rotation speed information may be defined by a current value, a voltage value, or the like corresponding to the rotation speed.

As one example, the following description is given by assuming that the operation rod main body 21 has a tilt angle ($\theta$) of 50° each in the front direction and the rear direction, and the left side motor 60a and the right side motor 60b have a rated rotation speed of 50 min$^{-1}$. However, the configurations of the operation rod main body 21, the left side motor 60a, and the right side motor 60b are not limited thereto, and may be configured in various ways.

In addition, in the following description, the neutral position of the operation rod main body 21 is indicated as 0°, a front inclination angle is indicated as positive (+), a rear inclination angle is indicated as negative (−), the rotation speeds of the left side motor 60a and the right side motor 60b in a direction of advancing the aerial work platform 1 is indicated as positive (+), and the rotation speeds of the left side motor 60a and the right side motor 60b in a direction of retreating the aerial work platform 1 is indicated as negative (−).

Tables 1 to 3 listed below show examples of defining a correspondence relationship between the tilt positions of the operation rod main body 21 and the basic rotation speeds based on the above-described assumption.

(2-2) First Example of Defining Basic Rotation Speed: Constant Speed Type

Table 1 below shows the first example of defining the tilt positions of the operation rod main body 21 and the basic rotation speeds that corresponds to the tilt positions and that are common to the left side motor 60a and the right side motor 60b.

In this example, the basic rotation speed is set to "0" (stop) when the operation rod main body 21 is at the neutral position (0°). The basic rotation speed is set to a positive (+) constant rotation speed (+50 min$^{-1}$ in the example shown in Table 1) regardless of the tilt angle when the operation rod main body 21 is at the front inclination position (0°<$\theta$≤+50°). The basic rotation speed is set to a negative (−) constant rotation speed (−50 min$^{-1}$ in the example shown in Table 1) regardless of the tilt angle when the operation rod main body 21 is at the rear inclination position (0°>$\theta$≥−50°).

TABLE 1

First Example of Defining Basic Rotation Speed: Constant Speed Type

| Tilt Angle $\theta$ of Operation Rod Main Body | Basic Rotation Speed r |
|---|---|
| 0° < $\theta$ ≤ +50° | r = +50 min$^{-1}$ (Constant) |
| $\theta$ = 0° | r = 0 min$^{-1}$ (Stop) |
| 0° > $\theta$ ≥ −50° | r = −50 min$^{-1}$ (Constant) |

Note that, if the tilt angle detection sensor 28 has a dead zone (backlash in the neutral position of the operation rod main body 21), "0°" in "$\theta$=0°" shown in Table 1 above may include the dead zone (backlash). For example, "0°" may mean "0±6°" if the operation rod main body 21 has a dead zone (backlash) of ±6° in the front and rear directions from an upright position (the same applies hereinafter).

(2-3) Second Example of Defining Basic Rotation Speed: Variable (Linear Variation) Type Note that the basic rotation speed is not limited to the example shown in Table 1 and may be defined as a variable speed that increases as the tilt angle of the operation rod main body 21 increases.

As one example, Table 2 below shows an example of defining the basic rotation speed in such a manner that an absolute value of the basic rotation speed linearly increases with the increase in an absolute value of the tilt angle of the operation rod main body 21.

TABLE 2

Second Example of Defining Basic Rotation Speed: Variable (Linear Variation) Type

| Tilt Angle $\theta$ of Operation Rod Main Body | Basic Rotation Speed r |
|---|---|
| 0° < $\theta$ ≤ +50° | 0 min$^{-1}$ < r ≤ +50 min$^{-1}$ (Variable) |
| $\theta$ = 0° | r = 0 min$^{-1}$ (Stop) |
| 0° > $\theta$ ≥ −50° | 0 min$^{-1}$ > r ≥ −50 min$^{-1}$ (Variable) |

(2-4) Third Example of Defining Basic Rotation Speed: Variable (Gradual Variation) Type When the basic rotation speed is configured to vary in response to variation in the tilt angle of the operation rod main body 21, it is not limited to a configuration of varying linearly as described with reference to Table 2. For example, as shown in Table 3, the basic rotation speed may be set in such a manner that the basic rotation speed gradually increases for each predetermined range of the tilt angle of the operation rod main body 21.

TABLE 3

Third Example of Defining Basic Rotation Speed: Variable (Gradual Variation) Type

| Tilt Angle $\theta$ of Operation Rod Main Body | Basic Rotation Speed r |
|---|---|
| +30° < $\theta$ ≤ +50° | r = +50 min$^{-1}$ |
| +15° < $\theta$ ≤ +30° | r = +30 min$^{-1}$ |
| 0° < $\theta$ ≤ +15° | r = +15 min$^{-1}$ |
| $\theta$ = 0° | r = 0 min$^{-1}$ (Stop) |
| 0° > $\theta$ ≥ −15° | r = −15 min$^{-1}$ |
| −15° > $\theta$ ≥ −30° | r = −30 min$^{-1}$ |
| −30° > $\theta$ ≥ −50° | r = −50 min$^{-1}$ |

(3) Correction Information
(3-1) Overview

The above description of the basic rotation speeds defines rotation speeds that correspond to the tilt positions of the operation rod main body 21 and that are common to the left side motor 60a and the right side motor 60b. When the rotation control of the left side motor 60a and the right side motor 60b are performed on the basis of such basic rotation speeds, it is possible to advance the aerial work platform 1 in the straight direction, to retreat the aerial work platform 1 in the straight direction, and to stop the aerial work platform 1, but it is impossible to perform control to turn the aerial work platform 1 to the left or right.

In order to cause the aerial work platform 1 to make such turning movements, it is necessary to make a difference in rotation speed between the left side motor 60a and the right side motor 60b by correcting one or both of the basic rotation speeds of the left side motor 60a and the right side motor 60b according to the operation of the left turning switch 24 and the right turning switch 25.

As correction values of such basic rotation speeds, the above-described memory area 71 of the controller 70 stores the correction information for defining how to correct the above-described basic rotation speeds according to a situation of operating the left turning switch 24 and the right turning switch 25.

In this embodiment, the memory area 71 of the controller 70 is configured to store any of three correction patterns described later as the correction information. However, the memory area 71 may be configured to store two or more of the correction patterns, and the setting of the correction patterns may be configured to be changed through a selection made by the operator to change a method of performing the travel operations according to preference or the like of the operator.

(3-2) First Correction Pattern: Turning Operation Based on Amount of Operation of Turning Switch Table 4 illustrates a configuration example of the correction patterns for varying a difference in rotation speed between the left side motor 60a and the right side motor 60b depending on amounts of the operations (pressing duration or the number of presses) of the left turning switch 24 and the right turning switch 25, that is, the radius of a turn.

Note that Table 4 below shows the correction values in percentages (%) to the basic rotation speed. For example, 50% indicates a rotation speed that is ½ of the basic rotation speed, 100% indicates a rotation speed identical to the basic rotation speed (no correction), 0% indicates a rotation speed of zero (stop), and −100% indicates a rotation made at the same rotation speed as the basic rotation speed in an opposite direction from the direction of the basic rotation speed (the same applies hereinafter).

with a minimum turning radius. "3" corresponds to a straight movement. "6" indicates a turn (spin turn) to the right with the minimum radius. Table 4 defines the correction values of the basic rotation speed for the respective turn levels of 0 to 6.

The controller 70 is configured to cause the aerial work platform 1 to make a turning movement in response to an operation made by the operator, by correcting the basic rotation speed with a correction value on a turn level selected by the operator through the operation of the left turning switch 24 or the right turning switch 25.

As illustrated in FIG. 3, the controller 70 is provided with the operation amount counter 72 to enable selection of the turn levels in response to the operations of the right turning switch 25 and the left turning switch 24.

The operation amount counter 72 is configured to count the amounts of the operations of the left turning switch 24 and the right turning switch 25. In this embodiment, an initial value of the operation amount is set to "3". The operation amount is decremented by "−1" each time an operation is performed on the left turning switch 24. The operation amount is incremented by "+1" each time an operation is performed on the right turning switch 25.

Note that a lower limit value of the number of counts is set to "0". The number of counts remains at "0" even if an operation is further performed on the left turning switch 24 in the state where the number of counts is "0".

In addition, an upper limit value of the number of counts is set to "6". The number of counts remains at "6" even if an operation is further performed on the right turning switch 25 in the state where the number of counts is "6".

TABLE 4

Correction Table (Turning Switch Operation Amount Response Type)

| Tilt Direction of Operation Rod Main Body | Turn Level | Travel State | Correction Value of Basic Rotation Speed | |
|---|---|---|---|---|
| | | | Left Side Motor | Right Side Motor |
| Front Inclination | 0 | Spin Turn (Anticlockwise) | −100% (Reverse Rotation) | 100% |
| | 1 | Pivot Turn (Left Turn) | 0% (Stop) | (No Correction) |
| | 2 | Advance During Left Turn | 50% | |
| | 3 | Straight Movement (Advance) or Stop | 100% | |
| | 4 | Advance During Right Turn | (No Correction) | 50% |
| | 5 | Pivot Turn (Right Turn) | | 0% (Stop) |
| | 6 | Spin Turn (Clockwise) | | −100% (Reverse Rotation) |
| Rear Inclination | 0 | Spin Turn (Clockwise) | −100% (Normal Rotation) | 100% |
| | 1 | Pivot Turn (Left Turn) | 0% (Stop) | (No Correction) |
| | 2 | Retreat During Left Turn | 50% | |
| | 3 | Straight Movement (Retreat) or Stop | 100% | |
| | 4 | Retreat During Right Turn | (No Correction) | 50% |
| | 5 | Pivot Turn (Right Turn) | | 0% (Stop) |
| | 6 | Spin Turn (Anticlockwise) | | −100% (Normal Rotation) |

In the configuration example shown in Table 4 above, the travel state of the aerial work platform is divided into seven levels (referred to as "turn levels" in the present specification) of 0 to 6 with regard to an advance direction and a retreat direction. "0" indicates a turn (spin turn) to the left In addition, the operation amount counter 72 is configured to store the number of counts obtained through the increment and decrement as described above by sequentially overwriting the number of counts, hold the number of counts stored until the enable switch disposed on the operation rod 20 is turned off, and then return the number of counts to the initial value of "3" when the enable switch is turned off.

In addition, the controller 70 is configured to correct the basic rotation speed with a correction value defined according to the turn levels corresponding to the number of counts stored in the operation amount counter 72.

As a result, the controller 70 applies the correction value on the "turn level 3" shown in Table 4 in the state where the left turning switch 24 and the right turning switch 25 are not operated, that is, when the number of counts obtained by the operation amount counter 72 is the initial value of "3".

As shown in Table 4, the correction value on the turn level 3 is 100% for both the left side motor 60a and the right side motor 60b. A rotation speed of 100% of the basic rotation speed, that is, any of the basic rotation speeds shown in Tables 1 to 3 listed above, are applied to both the left side motor 60a and the right side motor 60b without any change. The aerial work platform 1 advances in the straight direction in the case where the operation rod main body 21 is at the front inclination position. The aerial work platform 1 retreats in the straight direction in the case where the operation rod main body 21 is at the rear inclination position. The aerial work platform 1 stops in the case where the operation rod main body 21 is at the neutral position.

As an example, when an operation is performed only on the left turning switch 24 in the above-described state and the number of counts obtained by the operation amount counter 72 changes in order of "2", "1", and "0" in response to the increase in the operation amount (pressing duration or the number of presses), the controller 70 changes the turn level to be applied in order of "turn level 2", "turn level 1", and "turn level 0" in response to the change in the number of counts, and corrects the rotation speed of the left side motor 60a in order of 50% (turn level 2), 0% (turn level 1), and −100% (turn level 0) of the basic rotation speed while maintaining the rotation speed of the right side motor 60b at 100% of the basic rotation speed.

This makes a difference in rotation speed between the left side motor 60a and the right side motor 60b. Accordingly, the aerial work platform 1 make a left turning movement and changes its travel state in order of a state where the aerial work platform 1 turn to the left while traveling (turn level 2), a state where the aerial work platform 1 makes the pivot turn in the left turning direction on the spot (turn level 1), and a state where the aerial work platform 1 makes the spin turn in the left turning direction on the spot (turn level 0) when the difference in rotation speed between the left side motor 60a and the right side motor 60b increases with the increase in the amount of the operation of the left turning switch 24. This makes it possible to gradually reduce the radius of a turn to the left.

In contrast to this, when an operation is performed on the right turning switch 25 in the state where the number of counts obtained by the operation amount counter 72 is set to "0" in response to the above-described operation of the left turning switch 24, the number of counts obtained by the operation amount counter 72 increases in order of "1", "2", and "3" in response to the increase in the amount of the operation (pressing duration or the number of presses) of the right turning switch 25, the controller 70 changes the turn level to be applied in order of "turn level 1", "turn level 2", and "turn level 3", and increases the rotation speed of the left side motor 60a of −100% (turn level 0) in order of 0% (turn level 1), 50% (turn level 2), and 100% (turn level 3) of the basic rotation speed to change the traveling direction of the aerial work platform 1 to the right and return the aerial work platform 1 to the state of traveling in the straight direction.

When an operation is further performed on the right turning switch 25 in the above-described state, the number of counts obtained by the operation amount counter 72 further increases in order of "4", "5", and "6" in response to the increase in the operation amount (pressing duration or the number of presses), and the controller 70 further changes the turn level to be applied in order of "turn level 4", "turn level 5", and "turn level 6".

With this, the rotation speed of the right side motor 60b is corrected in order of 50% (turn level 4), 0% (turn level 5), and −100% (turn level 6) of the basic rotation speed, and a difference in rotation speed is made between the right side motor 60b and the left side motor 60a maintained at the rotation speed of 100% of the basic rotation speed. Accordingly, the aerial work platform 1 turns to the right and changes its travel state in order of a state where the aerial work platform 1 turns to the right while traveling (turn level 4), a state where the aerial work platform 1 makes the pivot turn in the right turning direction on the spot (turn level 5), and a state where the aerial work platform 1 makes the spin turn in the right turning direction on the spot (turn level 6) in response to the increase in the difference in the rotation speed between the left side motor 60a and the right side motor 60b to make a right turn with a smaller turn radius.

Note that the above-described example has described the configuration in which the operation amount counter 72 starts counting with the initial value of "3". However, the operation amount counter may be configured to start counting with the initial value of "0", and the controller 70 may be configured to apply a correction value on a turn level corresponding to a number obtained by adding 3 to the number of counts obtained by the operation amount counter 72.

In addition, in Table 4 listed above, the numbers 0 to 6 are given to the respective turn levels. However, for example, the turn levels may be classified in such a manner that the number 0 is given to the turn level in the straight movement state (the correction number of 100% is used for both the left side motor 60a and the right side motor 60b), the numbers −1 to −3 are given to the turn levels in the left turning direction, and the numbers 1 to 3 are given to the turn levels in the right turning direction. Also in this case, the operation amount counter 72 may be configured to start counting with the initial value of "0".

Moreover, in the above description, the turn levels are set at the seven levels of 0 to 6. However, the turn levels may be set more minutely, and the travel state may be change more smoothly.

As described above, the correction table in Table 4 and the configuration of the operation amount counter 72 can be appropriately modified as long as it is possible to change the travel state according to the amounts of the operations of the left turning switch 24 and the right turning switch 25.

(3-3) Second Correction Pattern: Turning Operation Based on Tilt Position of Operation Rod Main Body In the configuration described above as the first correction pattern, as the correction information, it is possible to change the correction value in response to the change in the amounts of the operations (pressing duration or the number of presses) of the left turning switch 24 and the right turning switch 25, and it is possible to change the travel state of the aerial work platform 1 from a turn made during advance or retreat to the pivot turn and the spin turn made in a stopped state on the spot. This makes it possible to gradually reduce the turn radius.

In contrast to this, Table 5 below defines correction values to be applied depending on the tilt position of the operation rod main body 21 when the left turning switch 24 and the right turning switch 25 are operated. This allows the aerial work platform 1 to selectively make the pivot turn or the spin turn.

In this configuration, the controller 70 does not have to include the operation amount counter 72 as illustrated in FIG. 3.

Note that, unless otherwise described, Table 5 below shows correction values in percentages (%) to the basic rotation speed.

TABLE 5

Correction Table (Turning Operation Based on Tilt Position of Operation Rod Main Body)

| Operation of Operation Rod | | Correction Value of Basic Rotation Speed | | |
|---|---|---|---|---|
| Turning SW | Position | Left Side Motor | Right Side Motor | Traveling Movement |
| No Operation | Front Inclination | 100% (No Correction) | 100% (No Correction) | Advance (Straight Movement) |
| | Neutral | | | Stop |
| | Rear Inclination | | | Retreat (Straight Movement) |
| Left SW is Turned on | Front Inclination | 0% (Stop) | 100% (No Correction) | Pivot Turn (Left Turn) |
| | Neutral | Replacement with Negative Constant Value | Replacement with Positive Constant Value | Spin Turn (Anticlockwise) |
| | Rear Inclination | 0% (Stop) | 100% (No Correction) | Pivot Turn (Left Turn) |
| Right SW is Turned on | Front Inclination | 100% (No Correction) | 0% (Stop) | Pivot Turn (Right Turn) |
| | Neutral | Replacement with Positive Constant Value | Replacement with Negative Constant Value | Spin Turn (Clockwise) |
| | Rear Inclination | 100% (No Correction) | 0% (Stop) | Pivot Turn (Right Turn) |

When making a correction on the basis of the correction pattern illustrated in Table 5 above, in a state where the left turning switch 24 or the right turning switch 25 is not operated, the basic rotation speeds that are shown in Tables 1 to 3 and that are common to the left side motor 60a and the right side motor 60b are applied without any change. Therefore, the aerial work platform 1 advances in the straight direction in response to a front inclination operation of the operation rod main body 21, retreats in the straight direction in response to a rear inclination operation of the operation rod main body 21, and stops when the operation rod main body 21 is at the neutral position.

In addition, when the left turning switch 24 is pressed in the state where the operation rod main body 21 is at the neutral position without the tilt operation, a basic rotation speed (0) of the left side motor 60a is corrected in such a manner that the basic rotation speed (0) of the left side motor 60a is replaced with a negative constant value, a basic rotation speed (0) of the right side motor 60b is corrected in such a manner that the basic rotation speed (0) of the right side motor 60b is replaced with a positive constant value, and the aerial work platform 1 makes an anticlockwise spin turn in plan view. In contrast, the aerial work platform 1 makes a clockwise spin turn when the right turning switch 25 is pressed.

Moreover, when the left turning switch 24 is pressed in the state where the operation rod main body 21 is inclined forward or backward, or when the operation rod main body 21 is inclined forward or backward in the state where the left turning switch 24 is pressed, while the rotation speed of the right side motor 60b is maintained at 100% of the basic rotation speed, the rotation speed of the left side motor 60a is corrected to 0% of the basic rotation speed to stop the rotation of the left side motor 60a, and the aerial work platform 1 makes a pivot turn in the left turning direction. In contrast, the aerial work platform 1 makes a pivot turn in the right turning direction when the right turning switch 25 is pressed in the state where the operation rod main body 21 is inclined forward or backward, or when the operation rod main body 21 is inclined forward or backward in the state where the right turning switch 25 is pressed.

(3-4) Third Correction Pattern: Turning Operation Based on Tilt Position and Tilt Angle of Operation Rod Main Body In the tilt position corresponding type correction described above as the second correction pattern, the correction values are set only depending on at which of the three positions of the front inclination position, the neutral position, and the rear inclination position the operation rod main body 21 is regardless of the change in the tilt angle of the operation rod main body 21. However, the configuration in which the correction values are further varied in response to the change in the tilt angle of the operation rod main body 21 may be employed in the above-described second correction pattern to make the configuration as shown in Table 6 below.

TABLE 6

Correction Table (Turning Operation Based on Tilt Position and Tilt Angle of Operation Rod Main Body)

| Operation of Operation Rod | | Correction Value of Basic Rotation Speed | | |
|---|---|---|---|---|
| Turning SW | Tilt Angle θ | Left Side Motor | Right Side Motor | Traveling Movement |
| No Operation | 0° < θ<br>θ = 0°<br>0° > θ | 100%<br>(No Correction) | 100%<br>(No Correction) | Advance (Straight Movement)<br>Stop<br>Retreat (Straight Movement) |
| Left SW is Turned on | +45° ≤ θ | 0% (Stop) | 100% (No Correction) | Pivot Turn (Left Turn) |
| | 0° < θ ≤ +45° | 100% ≥ Correction Value > 0% | 100% (No Correction) | Left Turn |
| | θ = 0° | Replacement with Negative Constant Value | Replacement with Positive Constant Value | Spin Turn (Anticlockwise) |
| | 0° > θ > −45° | 100% ≥ Correction Value > 0% | 100% (No Correction) | Left Turn |
| | −45° ≥ θ | 0% (Stop) | 100% (No Correction) | Pivot Turn (Left Turn) |
| Right SW is Turned on | +45° ≤ θ | 100% (No Correction) | 0% (Stop) | Pivot Turn (Right Turn) |
| | 0° < θ < +45° | 100% (No Correction) | 100% ≥ Correction Value > 0% | Right Turn |
| | θ = 0° | Positive Constant Value | Negative Constant Value | Spin Turn (Clockwise) |
| | 0° > θ > −45° | 100% (No Correction) | 100% ≥ Correction Value > 0% | Right Turn |
| | −45° ≤ θ | 100% (No Correction) | 0% (Stop) | Pivot Turn (Right Turn) |

In the configuration shown in Table 6 above, in the state where the left turning switch 24 or the right turning switch 25 is not operated, a rotation speed of 100% of the basic rotation speed is applied to both the left side motor 60a and the right side motor 60b. Therefore, the aerial work platform 1 advances in the straight direction in response to a front inclination operation of the operation rod main body 21. In addition, the aerial work platform 1 retreats in the straight direction in response to a rear inclination operation of the operation rod main body 21. Furthermore, the aerial work platform 1 stops when the operation rod main body 21 is at the neutral position. Such a configuration is similar to the case where the basic rotation speed is corrected on the basis of the correction pattern shown in Table 5.

In addition, when the left turning switch 24 is pressed in the state where the operation rod main body 21 is at the neutral position without the tilt operation, the aerial work platform 1 makes an anticlockwise spin turn in plan view. In contrast, the aerial work platform 1 makes a clockwise spin turn when the right turning switch 25 is pressed. Such a configuration is also similar to the case of the correction pattern shown in Table 5.

Note that, in the configuration in which the rotations of the left side motor 60a and the right side motor 60b are controlled on the basis of the correction pattern shown in Table 5 listed above, the aerial work platform 1 makes a pivot turn in the left turning direction in response to the operation of the left turning switch 24, and in the right turning direction in response to a press of the right turning switch 25 regardless of the tilt angle of the operation rod main body 21 when the left turning switch 24 or the right turning switch 25 is operated in the state where the operation rod main body 21 is inclined forward or backward, or when the operation rod main body 21 is inclined forward or backward in the state where the left turning switch 24 or the right turning switch 25 is pressed.

In contrast to this, in the case where the rotation speeds are controlled on the basis of the correction pattern shown in Table 6 listed above, the aerial work platform 1 makes a pivot turn on the spot in the case where the tilt amount of the operation rod main body 21 is 45° or more with respect to the neutral position when the left turning switch 24 or the right turning switch 25 is operated in the state where the operation rod main body 21 is inclined forward or backward, or when the operation rod main body 21 is inclined forward or backward in the state where the left turning switch 24 or the right turning switch 25 is pressed. However, in the case where the tilt amount is less than 45°, the rotation speed of the left side motor 60a is decreased to a range of 100% to 0% of the basic rotation speed in response to the increase in the tilt amount, the turning state of the aerial work platform 1 is changed in such a manner that the turn radius of the aerial work platform 1 gradually gets smaller as the tilt amount increases, and the aerial work platform 1 transitions to the pivot turn when the tilt amount reaches 45° or more.

[Operation of Traveling Operation Device]

Operations of the traveling operation device 10 of the present invention including the controller 70 described above will be described with reference to the flowcharts illustrated in FIG. 7 and FIG. 9.

Note that, in the traveling operation device 10 of the present invention, since a state of operating the operation rod 20 and rotation control of the left side motor 60a and the right side motor 60b are different depending on which of the patterns shown in Tables 4 to 6 are employed as the correction information stored in the memory area 71 of the controller 70, each is described separately depending on the case.

(1) Turning Operation Based on Amount of Operation (Operation Duration) of Turning Switch (Corresponding to Table 4)

Figure 7:
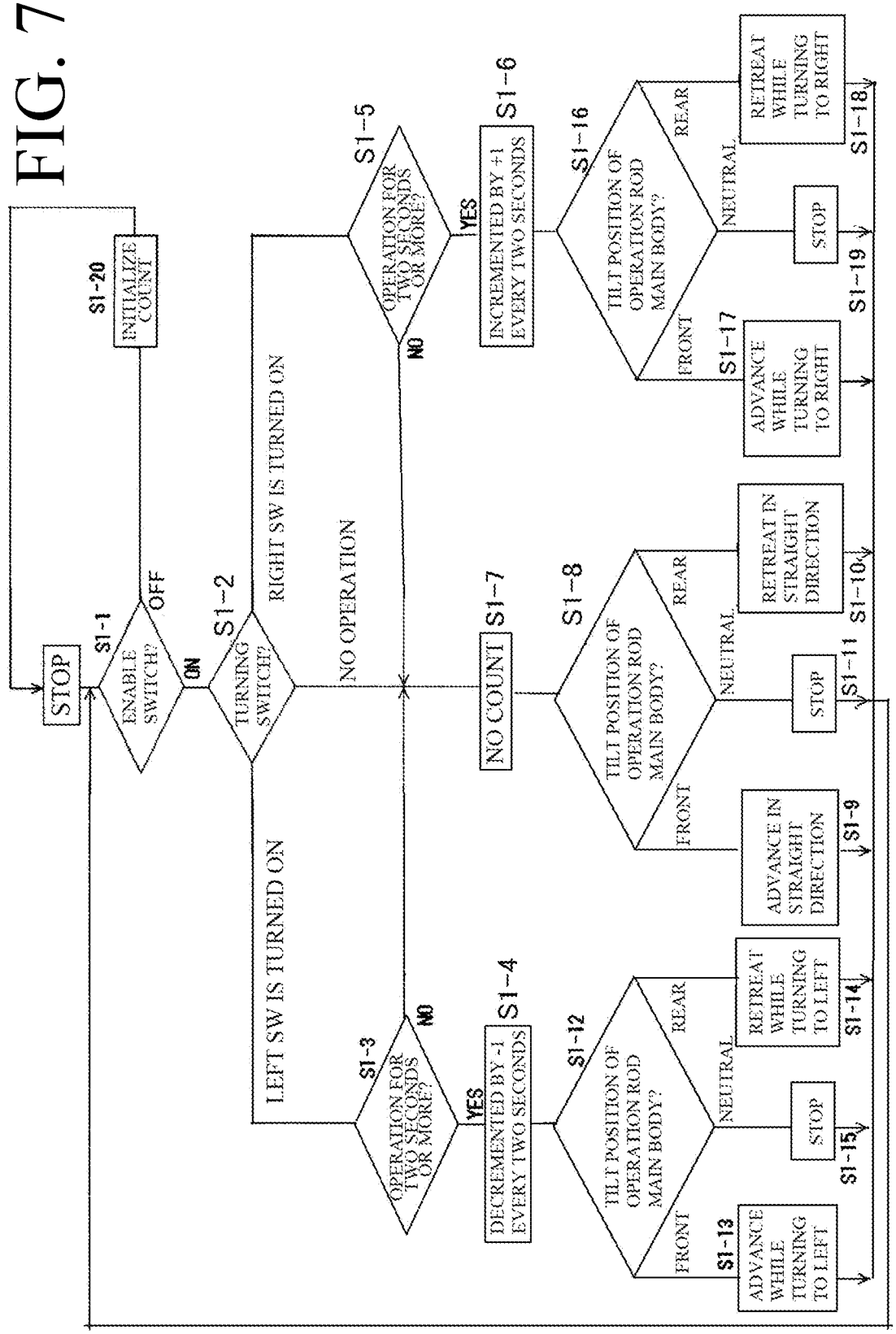
FIG. 7 is an operational flow of the aerial work platform including a drive operating device according to an embodiment of the present invention.

FIG. 7 illustrates movements of the traveling operation device 10 provided with the controller 70 that includes the operation amount counter 72. In the traveling operation device 10, the memory area 71 stores the correction information described with reference to Table 4, and the operation amount counter 72 counts and stores the amounts of the operations of the left turning switch 24 and the right turning switch 25.

Note that, in this embodiment, the operation amount counter 72 counts duration of pressing the left turning switch 24 and the right turning switch 25 as the operation amounts. A long press for two seconds is counted as a single operation amount. For example, an operation of long-pressing the right turning switch for six seconds and an operation of repeating a long press for two seconds three times is each counted as "+3".

In the traveling operation device 10 of the present invention including the controller 70 configured as described above, in the state where no operation is performed on the operation rod 20 disposed on the control panel 11, the aerial work platform 1 is in a stopped state. In addition, when the enable switch 22 is turned off, the number of counts obtained by the operation amount counter 72 is set to the initial value of "3".

When the grip portion 26 of the operation rod 20 disposed on the control panel 11 is gripped together with the enable switch 22 in the above-described state, the enable switch 22 turns on (S1-1), and the travel operation by the tilt operation of the operation rod main body 21 and the operations of the left turning switch 24 and the right turning switch 25 is enabled.

When the left turning switch 24 is operated in the state where the enable switch 22 is turned on as described above ("LEFT SW IS TURNED ON" in S1-2), the operation amount counter 72 determines whether or not the duration of pressing the left turning switch 24 is two seconds or more (S1-3). When the pressing duration is two seconds or more, with respect to the initial value of "3", the operation amount is decremented by "−1" when the pressing duration is two seconds or more and less than four seconds, and the operation amount is decremented by "−2" when the pressing duration is four seconds or more and less than six seconds. The operation amount is decremented by "−1" each time the pressing duration increases by two seconds (note that a minimum value of the number of counts is "0", and the operation amount is not decremented to less than 0), and the obtained number of counts is stored (S1-4).

In contrast, when the right turning switch 25 is operated in the state where the enable switch 22 is turned on ("RIGHT SW IS TURNED ON" in S1-2), the operation amount counter 72 determines whether or not the duration of pressing the right turning switch 25 is two seconds or more (S1-5). When the pressing duration is two seconds or more, the operation amount is incremented by "+1" when the pressing duration is two seconds or more and less than four seconds, and the operation amount is incremented by "+2" when the pressing duration is four seconds or more and less than six seconds. The operation amount is incremented by "+1" each time the pressing duration increases by two seconds (note that a maximum value of the number of counts is set to "6", and the operation amount is not incremented to more than 6), and the obtained number of counts is stored (S1-6).

In the case where the left turning switch 24 and the right turning switch 25 is not operated after the enable switch 22 is turned on ("NO OPERATION" in S1-2), or in the case where the left turning switch 24 or the right turning switch 25 is operated, but the pressing duration is less than two seconds (NO in S1-3 or NO in S1-5), the operation amount counter 72 does not newly count an operation amount, and the original number of counts (which is the initial value of "3" in this example) is maintained (S1-7).

Here, the controller 70 corrects the basic rotation speeds of the left side motor 60a and the right side motor 60b by applying a correction value on a turn level corresponding to the number of counts obtained by the operation amount counter 72 among the correction values shown in Table 4. Therefore, when the number of counts obtained by the operation amount counter 72 is "3", the basic rotation speeds are corrected with a correction value defined as the "turn level 3" and applied to the left side motor 60a and the right side motor 60b.

The correction value on the "turn level 3" is 100% for both the left side motor 60a and the right side motor 60b (see Table 4). Accordingly, in the state where the left turning switch 24 and the right turning switch 25 has never been operated since the start of the travel operation, or in the case where the pressing duration is less than two seconds although the left turning switch 24 and the right turning switch 25 is operated, a tilt operation is performed on the operation rod main body 21 in such a state (S1-8). In response to a front inclination operation of the operation rod main body 21, the left side motor 60a and the right side motor 60b normally rotates at the common basic rotation speed, and this allows the aerial work platform to advance in the straight direction (S1-9). Examples of the basic rotation speed include a constant speed of 50 min' regardless of the tilt angle of the operation rod main body in the case where a fixed basic rotation speed shown in Table 1 listed above is employed as the basic rotation speed, and a basic rotation speed that varies in a range of 50 min' or less in response to the tilt angle of the operation rod main body 21 in the case where a variable basic rotation speed shown in Table 2 and Table 3 is employed. When a rear inclination operation is performed on the operation rod main body 21, the left side motor 60a and the right side motor 60b rotate reversely at the common basic rotation speed similar to the case where the aerial work platform advances, and this allows the aerial work platform to retreat in the straight direction (S1-10). When the operation rod main body 21 is not operated but remains at the neutral position, the aerial work platform does not travel but keeps stopping (S1-11).

In contrast, in the state where the left turning switch 24 is operated for two seconds or more (in the state where the number of counts is 2 to 0), a correction value on a turn level (turn levels 2 to 0) corresponding to the number of counts is applied. When a tilt operation is performed on the operation rod main body 21 in such a state (S1-12), the rotation speed of the right side motor 60b is maintained at 100% of a reference rotation speed in response to a front inclination operation of the operation rod main body 21, but the rotation speed of the left side motor 60a is corrected to 50% of the reference rotation speed (turn level 2), 0% of the reference rotation speed (turn level 1), or −100% of the reference rotation speed (turn level 0) depending on the turn levels (the number of counts obtained by the operation amount counter 72) (see Table 4). This makes a difference in rotation speed between the right side motor 60b and the left side motor 60a, and allows the aerial work platform 1 to turn to the left (S1-13) and to change its travel state in such a manner that the aerial work platform 1 turns to the left (turn level 2) while advancing according to the pressing duration of the left turning switch 24, the aerial work platform 1 makes a pivot turn in the left turning direction on the spot (turn level 1), and the aerial work platform 1 makes a spin turn in the left turning (anticlockwise) direction on the spot (turn level 0). This makes it possible to gradually reduce the turn radius.

In addition, similarly in the case where the rear inclination operation is performed on the operation rod main body 21, the rotation speed of the right side motor 60b is maintained at 100% of the reference rotation speed, but the rotation speed of the left side motor 60a is corrected depending on the turn levels (the number of counts obtained by the operation amount counter 72). This makes a difference in rotation speed between the right side motor 60b and the left side motor 60a, and allows the aerial work platform 1 to turn to the left (S1-14) and to change its travel state depending on the pressing duration of the left turning switch 24 in such a manner that the aerial work platform 1 turns to the left (turn level 2) while retreating, the aerial work platform 1 makes a pivot turn in the left turning direction on the spot (turn level 1), and the aerial work platform 1 makes a spin turn in the left turning (clockwise) direction on the spot (turn level 0). This makes it possible to gradually reduce the turn radius.

Note that the aerial work platform 1 does not travel but keeps stopping even in the case where the number of counts is changed in response to an operation of the left turning switch 24 and the turn level to be applied is changed, and in the case where the operation rod main body 21 is not operated but remains at the neutral position (S1-15). However, since the operation amount counter 72 holds the number of counts, the operation of the left turning switch 24 performed here is reflected in rotation speeds applied to the left side motor 60a and the right side motor 60b when the tilt operation is performed on the operation rod main body 21 next time.

In addition, when the tilt operation is performed on the operation rod main body 21 in the state where the right turning switch 25 are operated for two seconds or more (in the case of turn levels 4 to 6) (S1-16), the rotation speed of the left side motor 60a is maintained at 100% of the reference rotation speed in response to the front inclination operation of the operation rod main body 21, but the rotation speed of the right side motor 60b is corrected depending on the turn levels to 50% of the reference rotation speed (turn level 4), 0% of the reference rotation speed (turn level 5), or −100% of the reference rotation speed (turn level 6) (see Table 4). This makes a difference in rotation speed between the left side motor 60a and the right side motor 60b, and allows the aerial work platform 1 to turn to the right (S1-17) and to change its travel state depending on the pressing duration of the right turning switch 25 in such a manner that the aerial work platform 1 turns to the right (turn level 4) while traveling, the aerial work platform 1 makes a pivot turn in the right turning direction on the spot (turn level 5), and the aerial work platform 1 makes a spin turn in the right turning (clockwise) direction on the spot (turn level 6). This makes it possible to gradually reduce the turn radius to makes a right turn.

In addition, similarly in the case where the rear inclination operation is performed on the operation rod main body 21, the rotation speed of the left side motor 60a is maintained at 100% of the reference rotation speed, but the rotation speed of the right side motor 60b is corrected depending on the change in the turn levels. This makes a difference in rotation speed between the left side motor 60a and the right side motor 60b, and allows the aerial work platform 1 to turn to the right (S1-18) and to change its travel state depending on the pressing duration of the right turning switch 25 in such a manner that the aerial work platform 1 turns to the right (turn level 4) while traveling, the aerial work platform 1 makes a pivot turn in the right turning direction on the spot (turn level 5), and the aerial work platform 1 makes a spin turn in the right turning (anticlockwise) direction on the spot (turn level 6). This makes it possible to gradually reduce the turn radius to make a right turn.

Note that the left side motor 60a, the right side motor 60b does not rotate and the aerial work platform 1 keeps stopping even in the case where the number of counts is changed in response to the operation of the right turning switch 25 and the turn level to be applied is changed, and in the case where the operation rod main body 21 is not operated but remains at the neutral position (S1-19). However, since the operation amount counter 72 counts the amount of the operation of the right turning switch 25 and holds the number of counts, the operation of the right turning switch 25 performed here is reflected in rotation speeds applied to the left side motor 60a and the right side motor 60b when the tilt operation is performed on the operation rod main body 21 next time.

As describe above, the number of counts counted by the operation amount counter 72 with the operations of the left turning switch 24 and the right turning switch 25 is held until the enable switch 22 is turned off and the number of counts is initialized (S1-20).

Therefore, in the case of further operating the left turning switch 24 or the right turning switch 25 (S1-2) while the enable switch 22 maintains the ON state (S1-1) in the state where the aerial work platform 1 is in any of the traveling states described above or the stopped state (S1-9 to 11, 13 to 15, and 17 to 19) with respect to a count value stored in the operation amount counter 72, the operation amount is decremented by "−1" each time the left turning switch 24 is operated, and the operation amount is incremented by "+1" each time the right turning switch 25 is operated. The above-described operations are repeated until the enable switch 22 is turned off.

As described above, the traveling operation device 10 of the present invention is configured to perform the travel operation on the aerial work platform 1 by the tilt operation of the operation rod main body 21 disposed on the operation rod 20 and the operation of the left turning switch 24 and the right turning switch 25. This allows the operator to perform the travel operation on the aerial work platform 1 with one hand while the operation rod main body 21 tiltable only in the front-rear axis direction is used as the operation rod main body 21.

In addition, by changing the amounts of the operations of the left turning switch 24 and the right turning switch 25, it is possible to gradually and naturally change the left turn and the right turn so as to reduce the turn radii.

(2) Turning Operation Based on Amount of Operation (Number of Times of Operation) of Turning Switch (Corresponding to Table 4)

Note that, in the configuration of the traveling operation device 10 described above, the operation amount counter 72 counts duration of pressing the left turning switch 24 and the right turning switch 25. However, instead of such a configuration, the operation amount counter 72 described above may be configured to count the number of presses on the left turning switch 24 and the right turning switch 25.

In this case, the traveling operation device 10 described with reference to FIG. 7 is configured to determine whether or not duration of pressing the left turning switch 24 and the right turning switch 25 is two seconds or more (S1-3 and S1-5) and make a count depending on the pressing duration (S1-4 and S1-6). However, in the configuration of this embodiment, the steps of determining whether or not the pressing duration is two seconds or more (S1-3 and S1-5) may be omitted from the operation steps illustrated in FIG. 7, and the steps of making a count (S1-4 and S1-6) may be changed to make a count depending on the number of presses instead of the pressing duration. Since the other configurations are similar to the configurations described with reference to FIG. 7, the description of the other configurations will be omitted.

(3) Turning Operation Based on Tilt Position of Operation Rod Main Body (Corresponding to Table 5)

Figure 8:
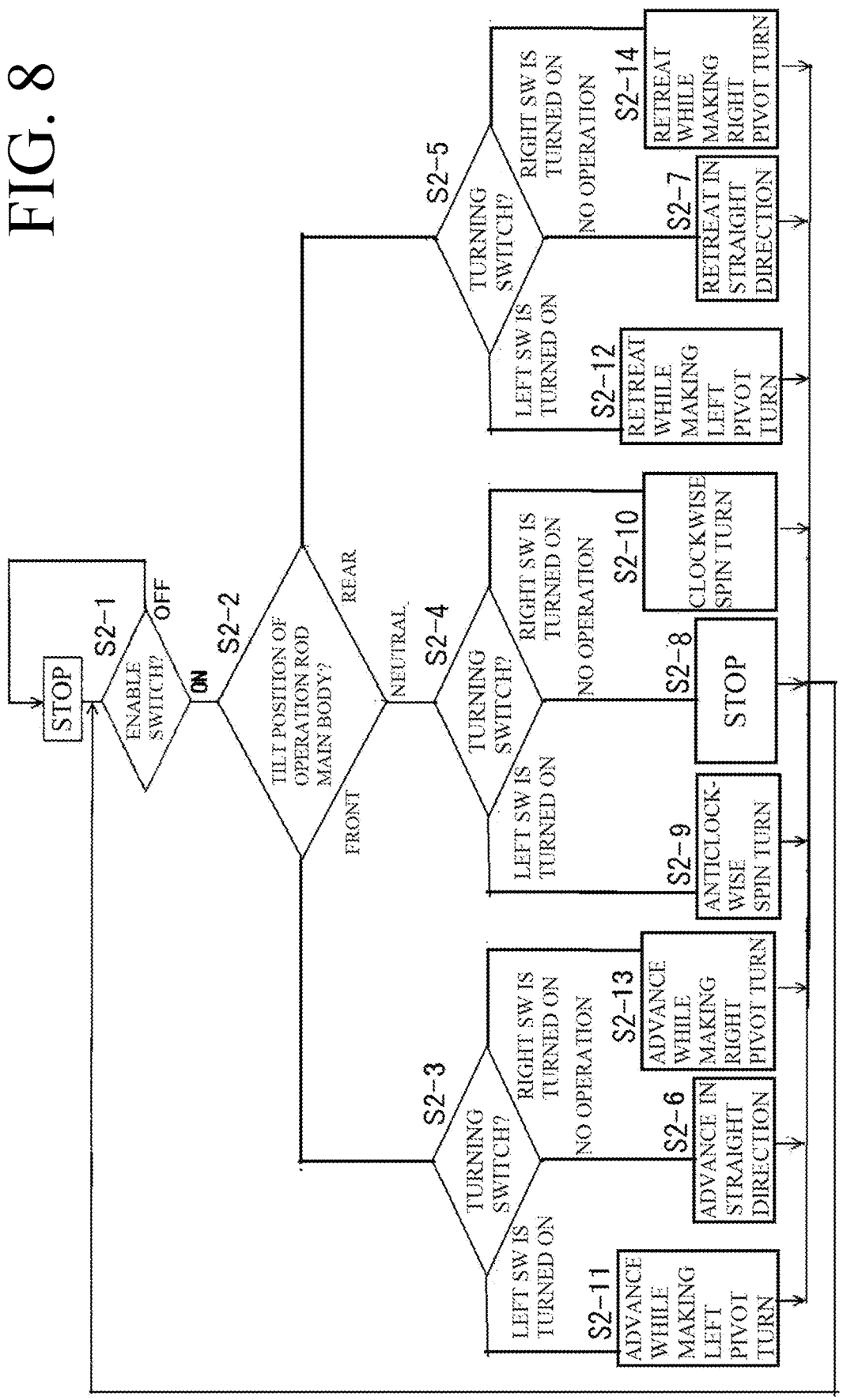
FIG. 8 is an operational flow of the aerial work platform including a drive operating device according to another embodiment of the present invention.

FIG. 8 is a flowchart for describing operations of the traveling operation device 10 including the controller 70 that stores the correction pattern shown in Table 5 listed above.

As illustrated in FIG. 8, the grip portion 26 of the operation rod 20 disposed on the control panel 11 is gripped together with the enable switch 22 in a state where the aerial work platform 1 is stopped. Accordingly, the enable switch 22 turns on (S2-1), and the travel operation by the tilt operation of the operation rod main body 21 and the operation of the left turning switch 24 and the right turning switch 25 is enabled. This is similar to the traveling operation device 10 described with reference to FIG. 7.

As described above, when the tilt operation is performed on the operation rod main body 21 (S2-2) without the operations of the left turning switch 24 and the right turning switch 25 in a state where the enable switch 22 is turned on ("NO OPERATION" in S2-3 to 5), the basic rotation speeds that are shown in Tables 1 to 3 and that are common to the left side motor 60*a* and the right side motor 60*b* are applied without any change (see Table 5). Therefore, the aerial work platform 1 advances in the straight direction in response to the front inclination operation of the operation rod main body 21 (S2-6). In addition, the aerial work platform 1 retreats in the straight direction in response to the rear inclination operation of the operation rod main body 21 (S2-7), and maintains the stopped state when the operation rod main body 21 is at the neutral position (S2-8).

In addition, the basic rotation speeds of the left side motor 60*a* and the right side motor 60*b* in the state where the operation rod main body 21 is at the neutral position without the tilt operation ("NEUTRAL" in S2-2) are both set to zero (0) (see Tables 1 to 3). However, when the left turning switch 24 is pressed in such a state ("LEFT SW IS TURNED ON" in S2-4), the basic rotation speed (0) of the left side motor 60*a* is corrected in such a manner that the basic rotation speed (0) of the left side motor 60*a* is replaced with a negative constant value, the basic rotation speed (0) of the right side motor 60*b* is corrected in such a manner that the basic rotation speed (0) of the right side motor 60*b* is replaced with a positive constant value, and the aerial work platform 1 makes an anticlockwise spin turn in plan view (S2-9) by rotating the left side motor 60*a* in a retreat direction at a constant speed and rotating the right side motor 60*b* in an advance direction at a constant speed.

In contrast, the aerial work platform 1 makes a clockwise spin turn (S2-10) by pressing the right turning switch 25 ("RIGHT SW IS TURNED ON" in S2-4) when the operation rod main body 21 is at the neutral position.

Moreover, when the left turning switch 24 is pressed ("LEFT SW IS TURNED ON" in S2-3 or S2-5) in the state where the operation rod main body 21 is inclined forward or backward ("FRONT INCLINATION" or "REAR INCLINATION" in S2-2), or when the operation rod main body 21 is inclined forward or backward in the state where the left turning switch 24 is pressed, while the rotation speed of the right side motor 60*b* is maintained at the basic rotation speed, the rotation speed of the left side motor 60*a* is corrected to 0% of the basic rotation speed to stop the left side motor 60*a* (see Table 5), and the aerial work platform 1 makes a pivot turn in the left turning direction (S2-11 and 12). In contrast to this, the aerial work platform 1 makes a pivot turn to turn to the right (S2-13 and 14) when the right turning switch 25 is pressed ("RIGHT SW IS TURNED ON" in S2-3 or S2-5) in the state where the operation rod main body 21 is inclined forward or backward ("FRONT INCLINATION" or "REAR INCLINATION" in S2-2), or when the operation rod main body 21 is inclined forward or backward in the state where the right turning switch 25 is pressed.

As described above, in the configuration of this embodiment, it is possible to easily decide to make the spin turn or the pivot turn depending on whether the left turning switch 24 and the right turning switch 25 are operated in the state where the operation rod main body 21 is at the neutral position or in the state where the operation rod main body 21 is tilted. This makes it possible to perform travel operations of the aerial work platform 1 extremely easily.

(4) Turning Operation Based on Tilt Position and Tilt Angle of Operation Rod Main Body (Corresponding to Table 6)

Operations of the traveling operation device 10 including the controller 70 that stores the correction information shown in Table 6 above will be described with reference to FIG. 9.

When a tilt operation is performed on the operation rod main body 21 (S3-2) without the operations of the left turning switch 24 and the right turning switch 25 ("NO OPERATION" in S3-3 to 5) in a state where the enable switch 22 is turned on (S3-1) and the travel operation by the tilt operation of the operation rod main body 21 and the operation of the left turning switch 24 and the right turning switch 25 is enabled in the case where the correction pattern shown in Table 6 above is employed, the basic rotation speeds that are shown in Tables 1 to 3 and that are common to the left side motor 60*a* and the right side motor 60*b* are applied without any change (see Table 6). Therefore, the aerial work platform 1 advances in the straight direction in response to the front inclination operation of the operation rod main body 21 (S3-6). In addition, the aerial work platform 1 retreats in the straight direction in response to the rear inclination operation of the operation rod main body 21 (S3-7), and keeps stopping when the operation rod main body maintains the neutral position (S3-8). This is similar to the operations in the case of employing the correction pattern shown in Table 5 described with reference to FIG. 8.

In addition, when the left turning switch 24 is pressed ("LEFT SW IS TURNED ON" in S3-4) in the state where the operation rod main body 21 is at the neutral position without the tilt operation ("NEUTRAL" in S3-2), the aerial work platform 1 makes an anticlockwise spin turn in plan view (S3-9). In contrast, the aerial work platform 1 makes a clockwise spin turn (S3-10) when the right turning switch 25 is pressed ("RIGHT SW IS TURNED ON" in S3-4) in the state where the operation rod main body 21 is at the neutral position. This is similar to the operations in the case of employing the correction pattern shown in Table 5 described with reference to FIG. 8.

In the configuration in which the travel operation is performed on the basis of the correction pattern shown in Table 5 described with reference to FIG. 8 described above, the aerial work platform 1 makes a pivot turn in the left turning direction in response to the operation of the left turning switch 24, and in the right turning direction in response to a press of the right turning switch 25 regardless of a tilt angle of the operation rod main body 21 when the left turning switch 24 or the right turning switch 25 is operated (S2-3 and S2-5) in the state where the operation rod main body 21 is inclined forward or backward ("FRONT" or "REAR" in S2-2), or when the operation rod main body 21 is inclined forward or backward in the state where the left turning switch 24 or the right turning switch 25 is pressed.

Figure 9:
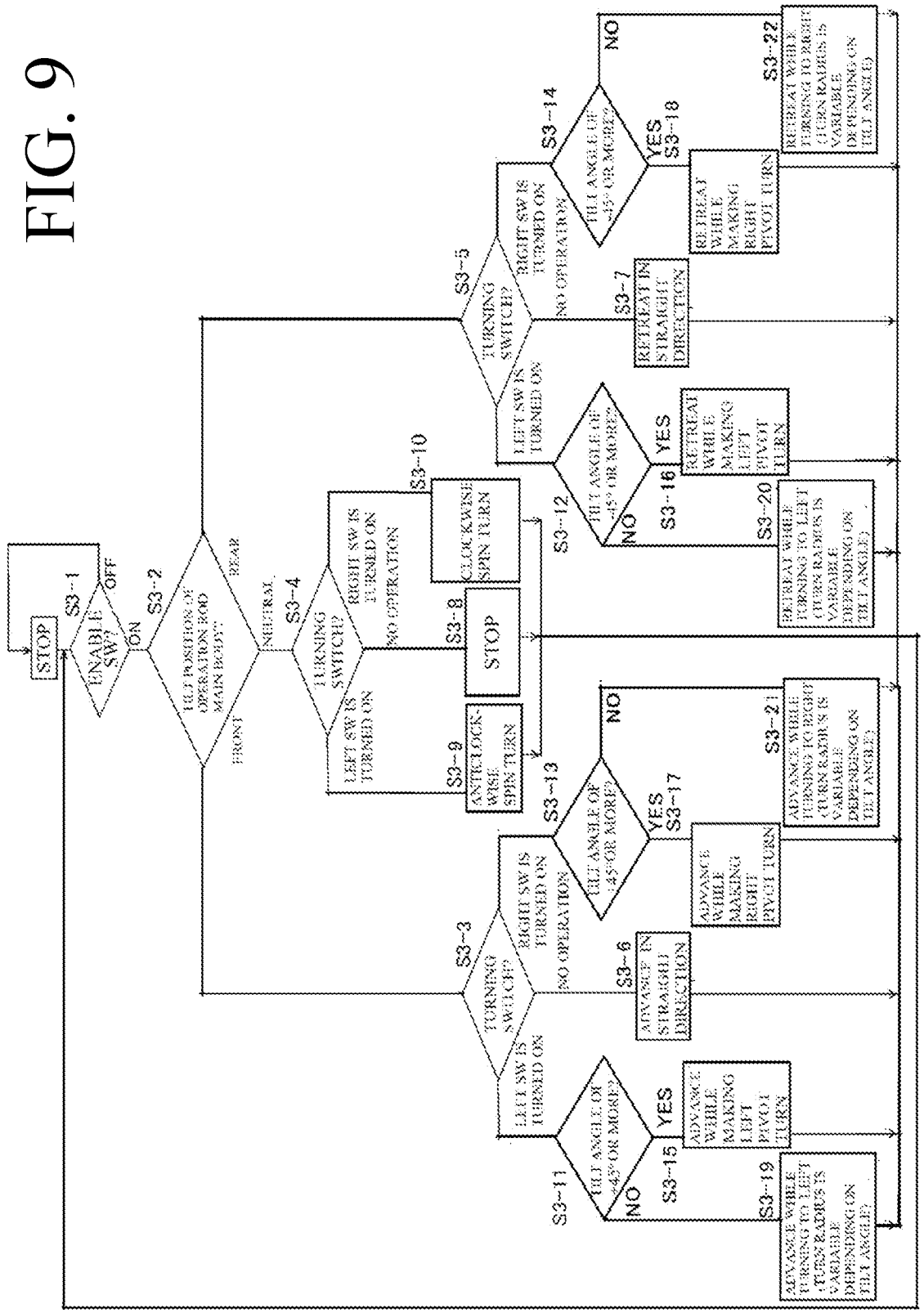
FIG. 9 is an operational flow of the aerial work platform including the drive operating device according to yet another embodiment of the present invention.
Figure 10:
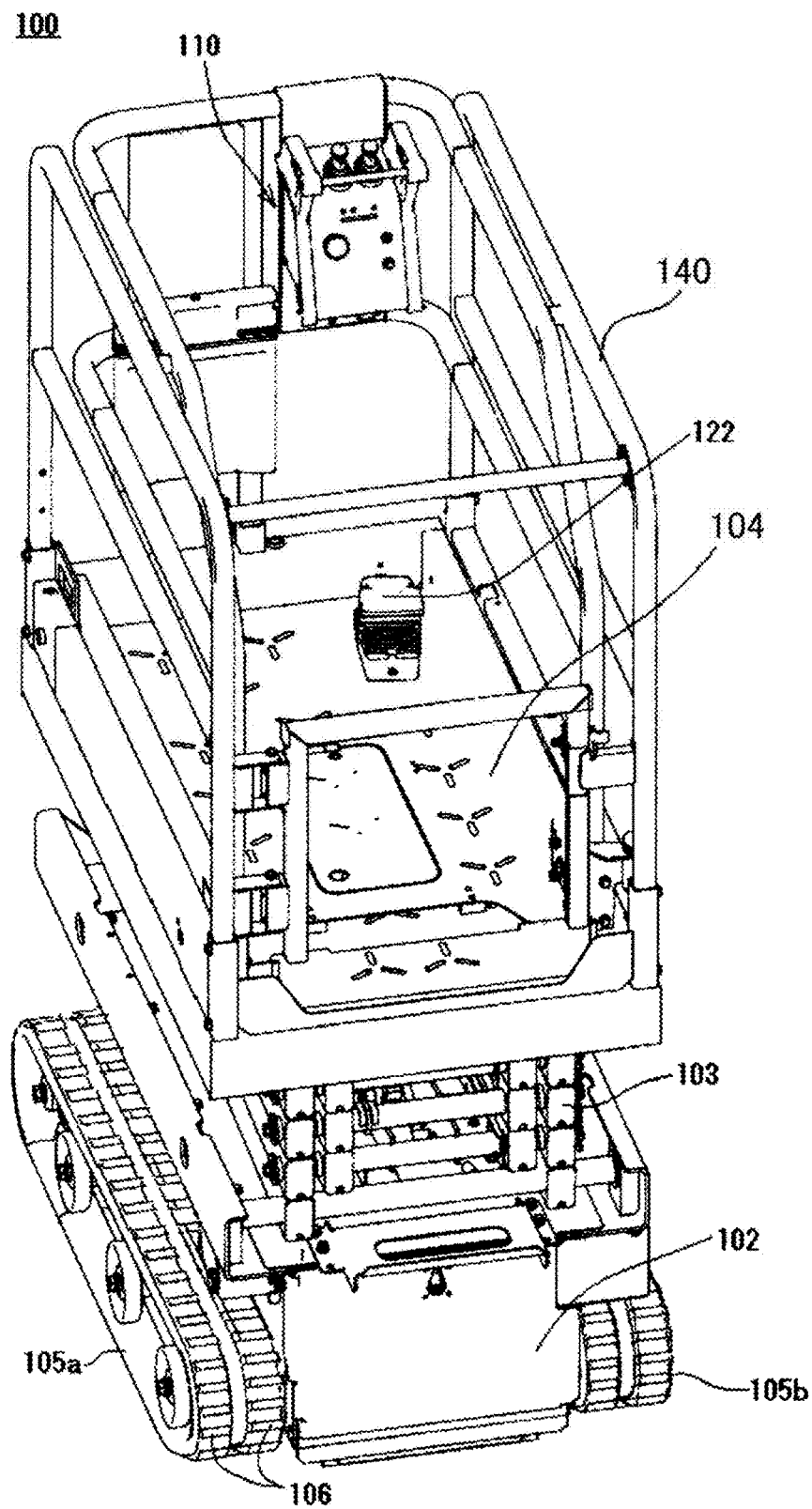
FIG. 10 is a perspective view of a conventional crawler-type aerial work platform.
Figure 11:
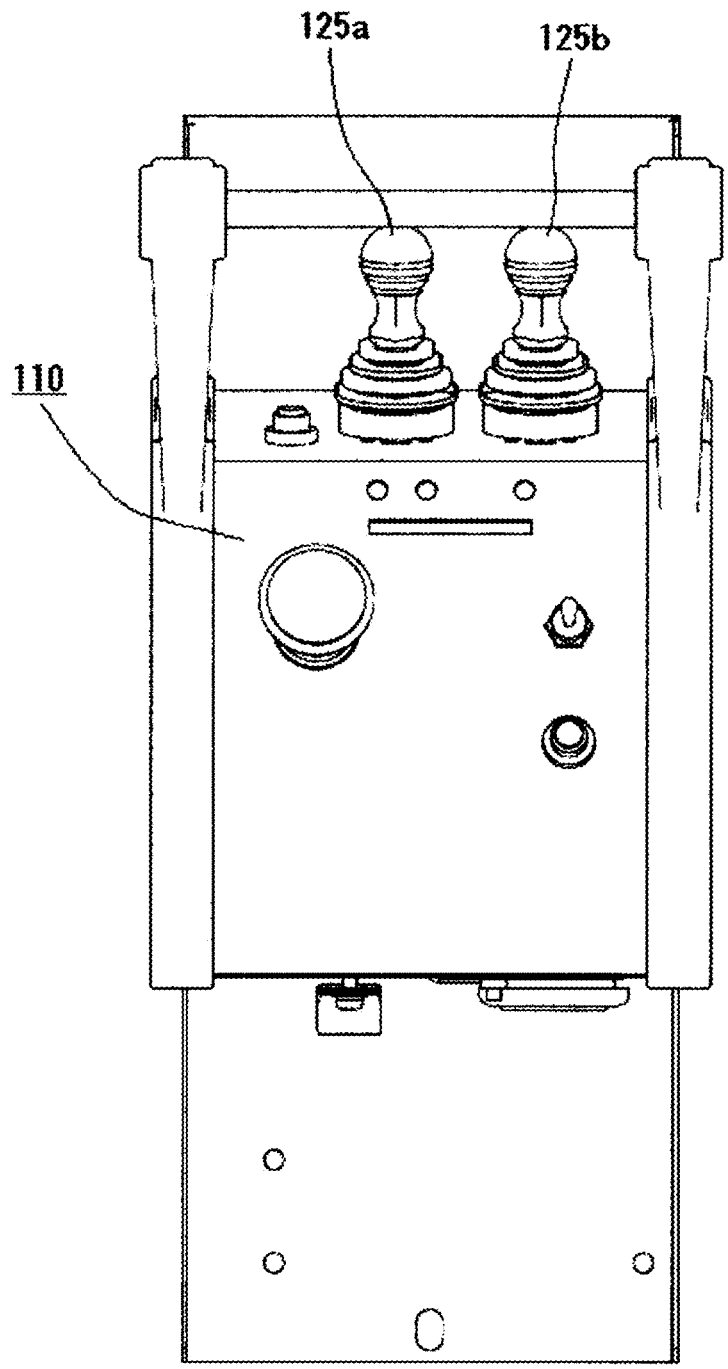
FIG. 11 is an explanatory view of a conventional drive operating device.
Figure 12:
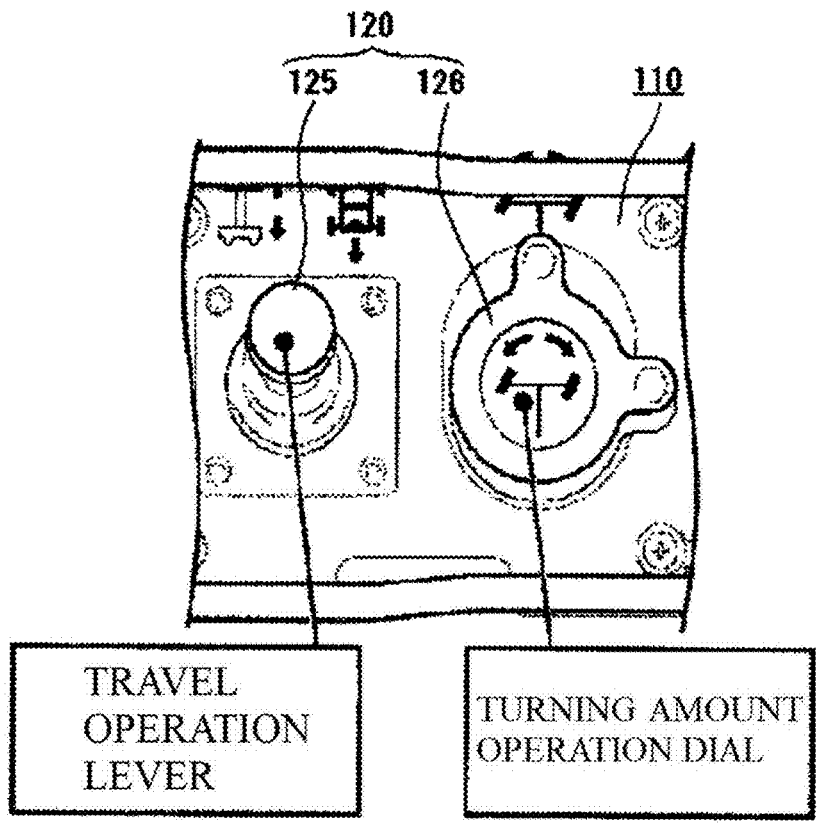
FIG. 12 is an explanatory view of a conventional drive operating device (corresponds to the configuration in FIG. 3 in Patent Document 1)
Figure 13:
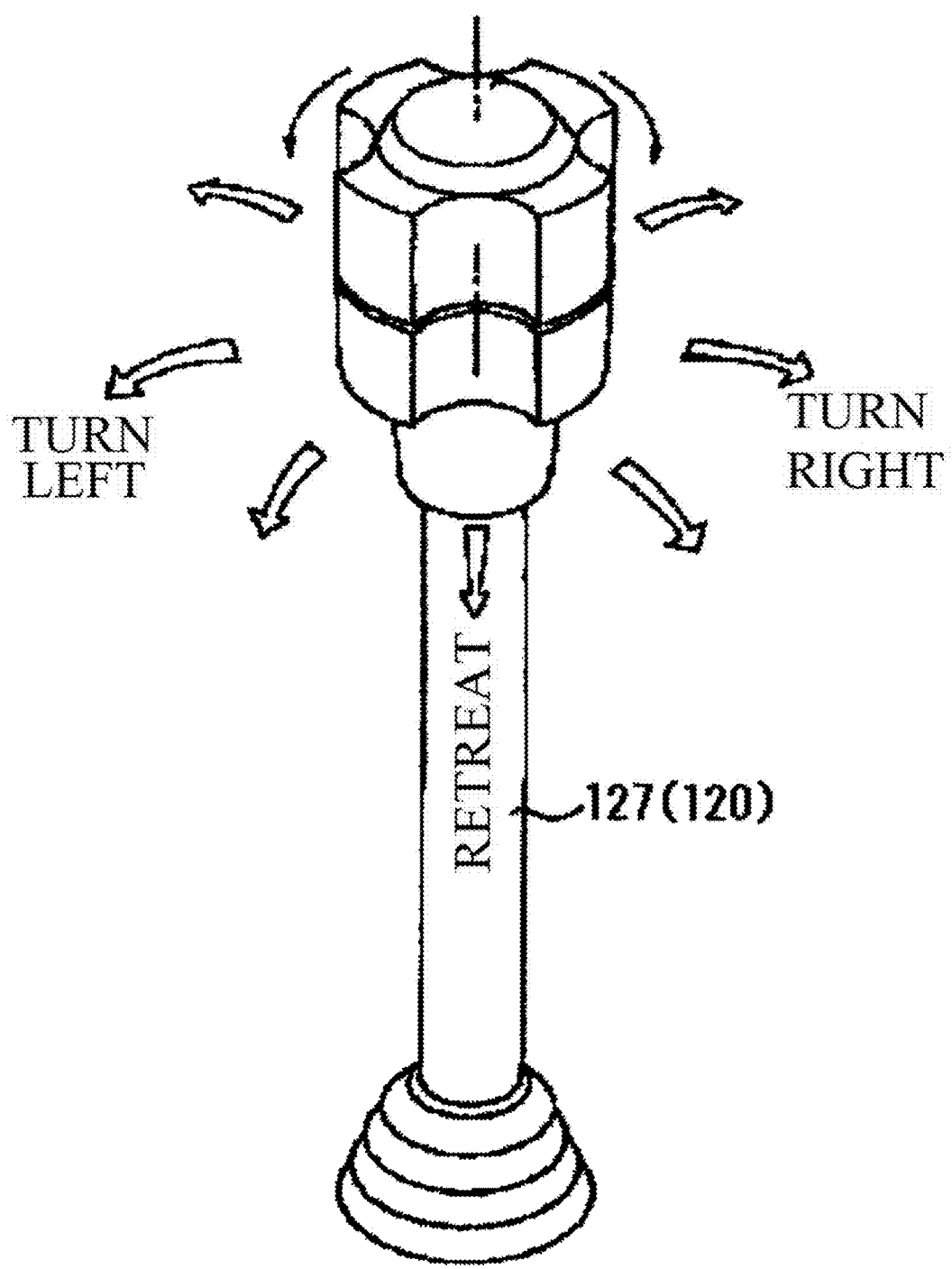
FIG. 13 is an explanatory view of a conventional drive operating device (corresponds to the configuration in FIG. 1 in Patent Document 2).

In contrast to this, in the configuration of this embodiment in which the travel operation is performed on the basis of the correction pattern shown in Table 6 listed above illustrated in FIG. 9, when the left turning switch 24 or the right turning switch 25 is operated (S3-3 and 5) in the state where the operation rod main body 21 is inclined forward or backward ("FRONT" or "REAR" in S3-2), or when the operation rod main body 21 is inclined forward or backward in the state where the left turning switch 24 or the right turning switch 25 is pressed, it is determined whether an amount of tilt of the operation rod main body 21 is +45° or more in the front inclination direction with respect to the neutral position or −45° or more in the rear inclination direction with respect to the neutral position (S3-11 to 14). In the case where the tilt amount is +45° or more or −45° or more ("YES" in S3-11 to 14), the aerial work platform 1 makes a pivot turn in the left turning direction (S3-15 and 16) in response to the operation of the left turning switch 24, and the aerial work platform 1 makes a pivot turn in the right turning direction (S3-17 and 18) in response to a press of the right turning switch 25. In the case where the left turning switch 24 is pressed ("LEFT SW IS TURNED ON" in S3-3 and S3-5) and the tilt amount is less than +45° or less than −45° ("NO" in S3-11 and 12), the rotation speed of the left side motor 60*a* is decreased to a range of 100% to 0% of the basic rotation speed in response to the increase in the absolute value of the tilt angle (S3-19 and 20). In the case where the right turning switch 25 is pressed ("RIGHT SW IS TURNED ON" in S3-3 and 5) and the tilt amount is less than +45° or less than −45° ("NO" in S3-13 and 14), the rotation speed of the right side motor 60*b* is decreased to a range of 100% to 0% of the basic rotation speed in response to the increase in the absolute value of the tilt angle (S3-21 and 22). This allows the turning state of the aerial work platform 1 to change in such a manner that the turn gradually gets smaller in response to the increase in the amount of tilt of the operation rod main body 21 from the neutral position, and the aerial work platform 1 can naturally transitions to the pivot turn in the end.

In this configuration, similarly to the traveling operation device 10 described with reference to FIG. 8, while maintaining an advantage in which operations can be performed simply and easily, it is possible to change the travel state of the aerial work platform 1 in such a manner that the turn radius gets smaller until the travel state reaches the pivot turn in the end in response to the increase in the tilt angle of the operation rod main body 21, and the aerial work platform 1 can gradually and naturally transitions from the straight movement to the pivot turn in the end.

DESCRIPTION OF REFERENCE NUMERALS

1 Aerial work platform
2 Undercarriage
3 Elevating mechanism (scissors link mechanism)
4 Deck
5 Crawler
5*a* Left side crawler
5*b* Right side crawler
10 Traveling operation device
11 Control panel
12 Control panel main body
13 Casing
20 Operation rod
21 Operation rod main body
22 Enable switch
24 Left turning switch
25 Right turning switch
26 Grip portion
28 Tilt angle detection sensor
29 Attachment/removal detector
30 Bracket
31 Back surface plate
31*a* One side in the width direction (of the back surface plate)
31*b* Upper end side (of the back surface plate)
32 Side surface plate
32*a* One side in a height direction (of the side surface plate)
32*b* Upper end side (of the side surface plate)
33 Front surface plate
33*a* One side in the width direction (of the front surface plate)
33*b* Upper end side (of the front surface plate)
34 Suspension metal fitting
34*a* Suspension piece
34*b* Lock piece
34*c* Collar portion
40 Safety barrier
50 Emergency stop switch
60*a* Left side motor
60*b* Right side motor
70 Controller
71 Memory area
72 Operation amount counter
80 Cable
100 Aerial work platform
102 Undercarriage
103 Elevating mechanism (scissors link mechanism)
104 Deck
105*a* Left side crawler
105*b* Right side crawler
106 Lug
110 Control panel
120 Drive operating device
122 Enable switch
125*a* Left side traveling lever
125*b* Right side traveling lever
126 Turning amount operation dial
127 Lever
140 Safety barrier

What is claimed is:
1. A traveling operation device of self-propelled crawler-type aerial work platform comprising:

a left side crawler and a right side crawler as traveling devices;

an undercarriage including a left side motor and a right side motor, the left side motor and the right side motor independently driving the left side crawler and the right side crawler, respectively; and a deck configured to move up and down above the undercarriage, the traveling operation device including:
  a control panel disposed on the deck; and
  a controller that controls rotations of the left side motor and the right side motor according to an operation of an operation rod disposed on the control panel, the operation rod including:
  an operation rod main body that is capable of tilting only in a front-rear axis direction from a neutral position and that is configured to perform operations of advance, retreat, and stop of the aerial work platform in response to the tilt in the front-rear axis direction;
  a left turning switch configured to perform an operation of turning the aerial work platform in a left direction;
  a right turning switch configured to perform an operation of turning the aerial work platform in a right direction; and
  an enable switch that is configured of a momentary switch and that enables an operation performed on the operation rod main body and an operation performed on the left turning switch and the right turning switch only while the enable switch is pressed, and the left turning switch, the right turning switch, and the enable switch being disposed on the operation rod main body at positions capable of operating the operation rod main body, the left turning switch, and/or the right turning switch while the enable switch is pressed with a finger of a hand gripping the operation rod main body.

2. The traveling operation device of crawler-type aerial work platform according to claim 1, wherein
  the enable switch is disposed on a side surface on a front side of a grip portion of the operation rod main body.

3. The traveling operation device of crawler-type aerial work platform according to claim 2, wherein
  the left turning switch and the right turning switch are disposed next to each other in a left-right direction on a top surface of the grip portion of the operation rod main body.

4. The traveling operation device of crawler-type aerial work platform according to claim 2, wherein
  the controller has a memory area for storing basic rotation speeds that are respective rotation speeds common to the left side motor and the right side motor and that correspond to a neutral position, a front inclination position, and a rear inclination position of the operation rod main body, and for storing correction values of the rotation speeds of the left side motor and the right side motor on a basis of the basic rotation speeds, the correction value being applied when the aerial work platform turns left or right in response to a state of operating the left turning switch and the right turning switch,
  the left side motor and the right side motor are rotated at the basic rotation speed corresponding to a tilt position in a case where the left turning switch and the right turning switch are not operated but only a tilt operation is performed on the operation rod main body in response to the operations performed on the operation rod main body and the left turning switch or the right turning switch while the enable switch is pressed, and
  when the left turning switch or the right turning switch is operated, the basic rotation speed is corrected by using the correction value and the rotation speeds of the left side motor and the right side motor are controlled in such a manner that the aerial work platform makes a turning movement.

5. The traveling operation device of crawler-type aerial work platform according to claim 4, wherein
  the memory area of the controller stores both the correction value to be used when the operation rod main body is at the neutral position and the correction value to be used when the operation rod main body is at the front inclination position or the rear inclination position,
  the controller performs control in such a manner that the basic rotation speed is corrected to obtain a predetermined rotation speed that causes the left side motor and the right side motor to operate at a same rotation speed in mutually opposite rotation directions when the left turning switch or the right turning switch is pressed in a state where the operation rod main body is at the neutral position,
  the aerial work platform turns left by correcting the basic rotation speed in such a manner that the rotation speed of the left side motor decreases when the left turning switch is pressed in a state where the operation rod main body is inclined forward or backward, and
  the aerial work platform turns right by correcting the basic rotation speed in such a manner that the rotation speed of the right side motor decreases when the right turning switch is pressed in a state where the operation rod main body is inclined forward or backward.

6. The traveling operation device of crawler-type aerial work platform according to claim 1, wherein
  the left turning switch and the right turning switch are disposed next to each other in a left-right direction on a top surface of the grip portion of the operation rod main body.

7. The traveling operation device of crawler-type aerial work platform according to claim 6, wherein
  the controller has a memory area for storing basic rotation speeds that are respective rotation speeds common to the left side motor and the right side motor and that correspond to a neutral position, a front inclination position, and a rear inclination position of the operation rod main body, and for storing correction values of the rotation speeds of the left side motor and the right side motor on a basis of the basic rotation speeds, the correction value being applied when the aerial work platform turns left or right in response to a state of operating the left turning switch and the right turning switch,
  the left side motor and the right side motor are rotated at the basic rotation speed corresponding to a tilt position in a case where the left turning switch and the right turning switch are not operated but only a tilt operation is performed on the operation rod main body in response to the operations performed on the operation rod main body and the left turning switch or the right turning switch while the enable switch is pressed, and
  when the left turning switch or the right turning switch is operated, the basic rotation speed is corrected by using the correction value and the rotation speeds of the left side motor and the right side motor are controlled in such a manner that the aerial work platform makes a turning movement.

8. The traveling operation device of crawler-type aerial work platform according to claim 7, wherein
the memory area of the controller stores both the correction value to be used when the operation rod main body is at the neutral position and the correction value to be used when the operation rod main body is at the front inclination position or the rear inclination position,
the controller performs control in such a manner that the basic rotation speed is corrected to obtain a predetermined rotation speed that causes the left side motor and the right side motor to operate at a same rotation speed in mutually opposite rotation directions when the left turning switch or the right turning switch is pressed in a state where the operation rod main body is at the neutral position,
the aerial work platform turns left by correcting the basic rotation speed in such a manner that the rotation speed of the left side motor decreases when the left turning switch is pressed in a state where the operation rod main body is inclined forward or backward, and
the aerial work platform turns right by correcting the basic rotation speed in such a manner that the rotation speed of the right side motor decreases when the right turning switch is pressed in a state where the operation rod main body is inclined forward or backward.

9. The traveling operation device of crawler-type aerial work platform according to claim 1, wherein
the controller has a memory area for storing basic rotation speeds that are respective rotation speeds common to the left side motor and the right side motor and that correspond to a neutral position, a front inclination position, and a rear inclination position of the operation rod main body, and for storing correction values of the rotation speeds of the left side motor and the right side motor on a basis of the basic rotation speeds, the correction value being applied when the aerial work platform turns left or right in response to a state of operating the left turning switch and the right turning switch,
the left side motor and the right side motor are rotated at the basic rotation speed corresponding to a tilt position in a case where the left turning switch and the right turning switch are not operated but only a tilt operation is performed on the operation rod main body in response to the operations performed on the operation rod main body and the left turning switch or the right turning switch while the enable switch is pressed, and
when the left turning switch or the right turning switch is operated, the basic rotation speed is corrected by using the correction value and the rotation speeds of the left side motor and the right side motor are controlled in such a manner that the aerial work platform makes a turning movement.

10. The traveling operation device of crawler-type aerial work platform according to claim 9, wherein
the controller includes an operation amount counter configured to count amounts of operations of the left turning switch and the right turning switch,
the memory area of the controller stores the correction value that varies depending on a number of counts obtained by the operation amount counter,
the aerial work platform turns left by correcting the basic rotation speed in such a manner that the rotation speed of the left side motor decreases and/or the rotation speed of the right side motor increases when the number of counts changes with increase in the amount of operation of the left turning switch, and
the aerial work platform turns right by correcting the basic rotation speed in such a manner that the rotation speed of the right side motor decreases and/or the rotation speed of the left side motor increases when the number of counts changes with increase in the amount of operation of the right turning switch.

11. The traveling operation device of crawler-type aerial work platform according to claim 10, wherein
the operation amount counter counts pressing duration of the left turning switch and the right turning switch as an operation amount.

12. The traveling operation device of crawler-type aerial work platform according to claim 10, wherein
the operation amount counter counts the number of presses on the left turning switch and the right turning switch as an operation amount.

13. The traveling operation device of crawler-type aerial work platform according to claim 9, wherein
the memory area of the controller stores both the correction value to be used when the operation rod main body is at the neutral position and the correction value to be used when the operation rod main body is at the front inclination position or the rear inclination position,
the controller performs control in such a manner that the basic rotation speed is corrected to obtain a predetermined rotation speed that causes the left side motor and the right side motor to operate at a same rotation speed in mutually opposite rotation directions when the left turning switch or the right turning switch is pressed in a state where the operation rod main body is at the neutral position,
the aerial work platform turns left by correcting the basic rotation speed in such a manner that the rotation speed of the left side motor decreases when the left turning switch is pressed in a state where the operation rod main body is inclined forward or backward, and
the aerial work platform turns right by correcting the basic rotation speed in such a manner that the rotation speed of the right side motor decreases when the right turning switch is pressed in a state where the operation rod main body is inclined forward or backward.

14. The traveling operation device of crawler-type aerial work platform according to claim 13, wherein
the controller corrects the basic rotation speed in such a manner that the rotation speed of the left side motor decreases to zero when the left turning switch is pressed in a state where the operation rod main body is inclined forward or backward, and
the controller corrects the basic rotation speed in such a manner that the rotation speed of the right side motor decreases to zero when the right turning switch is pressed in a state where the operation rod main body is inclined forward or backward.

15. The traveling operation device of crawler-type aerial work platform according to claim 13, wherein
the controller corrects the basic rotation speed in such a manner that the rotation speed of the left side motor gradually decreases to zero with increase in an amount of tilt of the operation rod main body from the neutral position when the left turning switch is pressed in a state where the operation rod main body is inclined forward or backward, and
the controller corrects the basic rotation speed in such a manner that the rotation speed of the right side motor gradually decreases to zero with increase in an amount of tilt of the operation rod main body from the neutral position when the right turning switch is pressed in a state where the operation rod main body is inclined forward or backward.

* * * * *